United States Patent
Ukita et al.

(10) Patent No.: US 9,820,262 B2
(45) Date of Patent: Nov. 14, 2017

(54) CONTROL DEVICE, COMMUNICATION SYSTEM, AND METHOD FOR REGISTERING TERMINAL DEVICES AND SCANNING FOR OTHER CONTROL DEVICES

(71) Applicant: Panasonic Intellectual Property Management Co., Ltd., Osaka (JP)

(72) Inventors: Yosuke Ukita, Osaka (JP); Toshio Taniguchi, Kyoto (JP); Takashi Fujii, Hyogo (JP); Teruhito Takeda, Hyogo (JP); Seiji Nimura, Hyogo (JP); Satoshi Okage, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 329 days.

(21) Appl. No.: 14/429,121

(22) PCT Filed: Aug. 27, 2013

(86) PCT No.: PCT/JP2013/005047
§ 371 (c)(1),
(2) Date: Mar. 18, 2015

(87) PCT Pub. No.: WO2014/045524
PCT Pub. Date: Mar. 27, 2014

(65) Prior Publication Data
US 2015/0230208 A1    Aug. 13, 2015

(30) Foreign Application Priority Data

Sep. 20, 2012    (JP) ................................. 2012-207435

(51) Int. Cl.
*H04W 72/04*    (2009.01)
*H04W 28/02*    (2009.01)
(Continued)

(52) U.S. Cl.
CPC ....... *H04W 72/04* (2013.01); *H04W 28/0278* (2013.01); *H04W 48/16* (2013.01); *H04W 80/02* (2013.01)

(58) Field of Classification Search
None
See application file for complete search history.

(56) References Cited

U.S. PATENT DOCUMENTS

| 6,782,260 B2 | 8/2004 | Nakakita et al. |
| 7,324,805 B2 | 1/2008 | Nakakita et al. |

(Continued)

FOREIGN PATENT DOCUMENTS

| JP | 2002-159053 | 5/2002 |
| JP | 2004-88299 | 3/2004 |

(Continued)

OTHER PUBLICATIONS

International Search Report (ISR) dated Nov. 19, 2013 in International (PCT) Application No. PCT/JP2013/005047.

*Primary Examiner* — Ayaz Sheikh
*Assistant Examiner* — Faiyazkhan Ghafoerkhan
(74) *Attorney, Agent, or Firm* — Wenderoth, Lind & Ponack, L.L.P.

(57) ABSTRACT

A control device includes: a receiving unit that receives a first beacon request for performing registration processing from a communication terminal device; a detection unit that detects a control signal indicating a request for starting the registration processing; a registration control unit that starts the registration processing when the detection unit detects the control signal and executes the registration processing for a certain period; and a transmission control unit that: transmits the beacon signal when the receiving unit receives the first beacon request in a period during which the registration control unit is executing the registration processing; and avoids transmitting the beacon signal when the first
(Continued)

beacon request is received in a period during which the registration control unit is not executing the registration processing.

10 Claims, 19 Drawing Sheets

(51) Int. Cl.
 *H04W 80/02* (2009.01)
 *H04W 48/16* (2009.01)

(56) References Cited

U.S. PATENT DOCUMENTS

| | | | |
|---|---|---|---|
| 7,356,333 B2 | 4/2008 | Kumaki | |
| 7,529,219 B2 | 5/2009 | Ishidoshiro | |
| 8,014,790 B2 | 9/2011 | Yotsumoto | |
| 2002/0061748 A1 | 5/2002 | Nakakita et al. | |
| 2005/0014503 A1 | 1/2005 | Nakakita et al. | |
| 2005/0190733 A1 | 9/2005 | Ishidoshiro | |
| 2006/0003756 A1 | 1/2006 | Kumaki | |
| 2006/0030318 A1* | 2/2006 | Moore | H04W 48/10 455/434 |
| 2006/0215601 A1* | 9/2006 | Vleugels | H04W 28/26 370/328 |
| 2008/0051099 A1* | 2/2008 | Moore | H04W 48/10 455/454 |
| 2008/0247377 A1* | 10/2008 | Van Horn | H04W 52/0225 370/348 |
| 2009/0069036 A1 | 3/2009 | Yotsumoto | |
| 2009/0168849 A1* | 7/2009 | Rouxel | H04B 1/707 375/140 |
| 2011/0006909 A1* | 1/2011 | Rekimoto | G01S 5/0236 340/8.1 |
| 2011/0069630 A1* | 3/2011 | Doppler | H04W 16/14 370/252 |
| 2011/0075641 A1* | 3/2011 | Siriwongpairat | H04W 4/12 370/337 |
| 2011/0148699 A1* | 6/2011 | Anderson | G01S 19/34 342/357.31 |
| 2012/0089731 A1* | 4/2012 | Bin | G08C 17/02 709/224 |
| 2012/0124367 A1* | 5/2012 | Ota | H04W 12/04 713/153 |
| 2014/0298427 A1* | 10/2014 | Bahr | H04L 63/08 726/4 |
| 2014/0337952 A1* | 11/2014 | Bahr | H04L 41/0806 726/7 |
| 2016/0029248 A1* | 1/2016 | Syed | H04W 28/08 370/235 |
| 2016/0042333 A1* | 2/2016 | Ho | G06Q 20/18 705/41 |
| 2016/0080228 A1* | 3/2016 | Suga | H04L 43/0823 370/252 |
| 2016/0086029 A1* | 3/2016 | Dubuque | G06K 9/00536 382/159 |
| 2016/0260301 A1* | 9/2016 | Miller | G08B 13/2417 |
| 2016/0261986 A1* | 9/2016 | Nord | H04W 4/023 |
| 2016/0277560 A1* | 9/2016 | Gruberman | H04W 8/245 |

FOREIGN PATENT DOCUMENTS

| | | |
|---|---|---|
| JP | 2005-223745 | 8/2005 |
| JP | 2006-19962 | 1/2006 |
| JP | 2006-186616 | 7/2006 |
| JP | 2009-55454 | 3/2009 |
| JP | 4316488 | 5/2009 |
| JP | 2012-28876 | 2/2012 |
| WO | 2011/129115 | 10/2011 |

* cited by examiner

FIG. 5

| | | |
|---|---|---|
| Empty | | ⟋11 |
| Empty | | |
| Empty | | |
| Network ID (Control device 3) | Device address | |
| Network ID (Control device 8) | Device address | |
| Network ID (Control device 4) | Device address | |
| Network ID (Control device 2) | Device address | |
| Network ID (Control device 5) | Device address | |

CONTROL DEVICE, COMMUNICATION SYSTEM, AND METHOD FOR REGISTERING TERMINAL DEVICES AND SCANNING FOR OTHER CONTROL DEVICES

TECHNICAL FIELD

The present invention relates to a control device that registers a communication terminal device as a target to be controlled via wireless communication and a method of scanning the control device.

BACKGROUND ART

In a network 30 as illustrated in FIG. 1 which includes a parent wireless communication device (hereinafter, referred to as a "control device") and a plurality of child wireless communication devices (hereinafter, referred to as "communication terminal devices"), it is necessary to perform implementation registration for registering the communication terminal devices 10a, 10b, . . . , 10n into the control device 20 before first using them.

As illustrated in FIG. 2, in order to register the communication terminal device 10 into the control device 20, the implementation registration (hereinafter, referred to also simply as "registration") includes: scanning (Step S10) performed by the communication terminal device 10 to search for the control device 20; association (Step S20) performed by the communication terminal device 10 to request the searched-out control device 20 to register the communication terminal device 10; and authentication (Step S30) performed by the control device 20 to authenticate the communication terminal device 10.

In the scanning, it is necessary for the communication terminal device to search a plurality of control devices including control devices in nearby networks in neighbors and the like for a desired control device to be connected (a home control device).

Therefore, for example, according to Institute of Electrical and Electronics Engineers (IEEE) 802.15.4, the communication terminal device broadcast-transmits (simultaneously transmits) a beacon request (referred to also as a "beacon request") to a plurality of control devices, and each control device which has received the beacon request transmits a beacon (referred to also as a "beacon signal") back to the communication terminal device. The communication terminal device receives such beacons from the control devices, and stores the beacons in a receiving buffer.

Subsequently, in the association (Step S20 in FIG. 2), the communication terminal device transmits a registration request (for example, association request) to a desired control device among the control devices which have transmitted the beacons. When the registration request is received from the communication terminal device, the control device determines whether or not to be connected to the communication terminal device, and transmits back to the communication terminal device a registration response (association response) added with information indicating connection permission or connection rejection.

If the registration response indicates connection permission and the association thereby has been completed, then, the authentication processing (Step S30 in FIG. 2) such as authentication of key information is performed between the control device and the communication terminal device, thereby completing the implementation registration.

On the other hand, if the registration response indicates connection rejection, the communication terminal device determines that the control device is not the desired control device and transmits a connection request sequentially to the other control devices which have transmitted the remaining beacons stored in the receiving buffer.

There is disclosed a technique by which, in a network as described above, only the desired control device (home control device) transmits a beacon twice in response to a beacon request of the communication terminal device, and the communication terminal device determines the control device as the home control device when receiving the second beacon (for example, see Patent Literature (PTL) 1).

Furthermore, there is disclosed another technique by which the control device transmits a beacon added with option information such as "connection permission or rejection", and the communication terminal device determines the control device as the home control device by analyzing the beacon (for example, see Patent Literature (PTL) 2).

CITATION LIST

Patent Literature

[PTL 1] Japanese Patent No. 4316488
[PTL 2] Japanese Unexamined Patent Application Publication No. 2006-19962

SUMMARY OF INVENTION

However, the conventional techniques have a problem that, if, for example, there is a large number of control devices in neighboring networks, a large number of receiving buffers (memories) are necessary in the terminal device to receive beacons from all the control devices.

In view of this, the present invention provides a control device and so on which allows for efficient search for a desired control device by a communication terminal device and for registration of the communication terminal device even when the communication terminal device is equipped with a small amount of memory.

A control device according to an aspect of the present invention is a control device that executes registration processing including transmitting a beacon signal in response to a beacon request transmitted from a communication terminal device to register the communication terminal device as a target to be controlled via wireless communication. The control device includes: a receiving unit configured to receive a first beacon request for performing the registration processing from the communication terminal device; a detection unit configured to detect a control signal indicating a request for starting the registration processing; a registration control unit configured to start the registration processing when the detection unit detects the control signal and execute the registration processing for a certain period; and a transmission control unit configured to: transmit the beacon signal for notifying presence of the control device when the receiving unit receives the first beacon request in a period during which the registration control unit is executing the registration processing; and avoid transmitting the beacon signal when the first beacon request is received in a period during which the registration control unit is not executing the registration processing.

It is to be noted that general or specific aspects of the above may be provided by a system, a method, an integrated circuit, a computer program, or a computer-readable recording medium such as a CD-ROM, and an arbitrary combination of a system, a method, an integrated circuit, a computer program, and a recording medium.

With the present aspect, times taken for searching the control device and for implementation registration can be shortened. Furthermore, since the amount of memory capacity of the communication terminal device can be reduced, costs can be reduced.

BRIEF DESCRIPTION OF DRAWINGS

FIG. 5 is a diagram indicating an example of a control device list to be stored in the communication terminal device.

DESCRIPTION OF EMBODIMENTS (Underlying Knowledge Forming Basis of the Present Invention)

The inventors of the present invention found the following problems in the control device disclosed in "Background Art".

Figure 3:
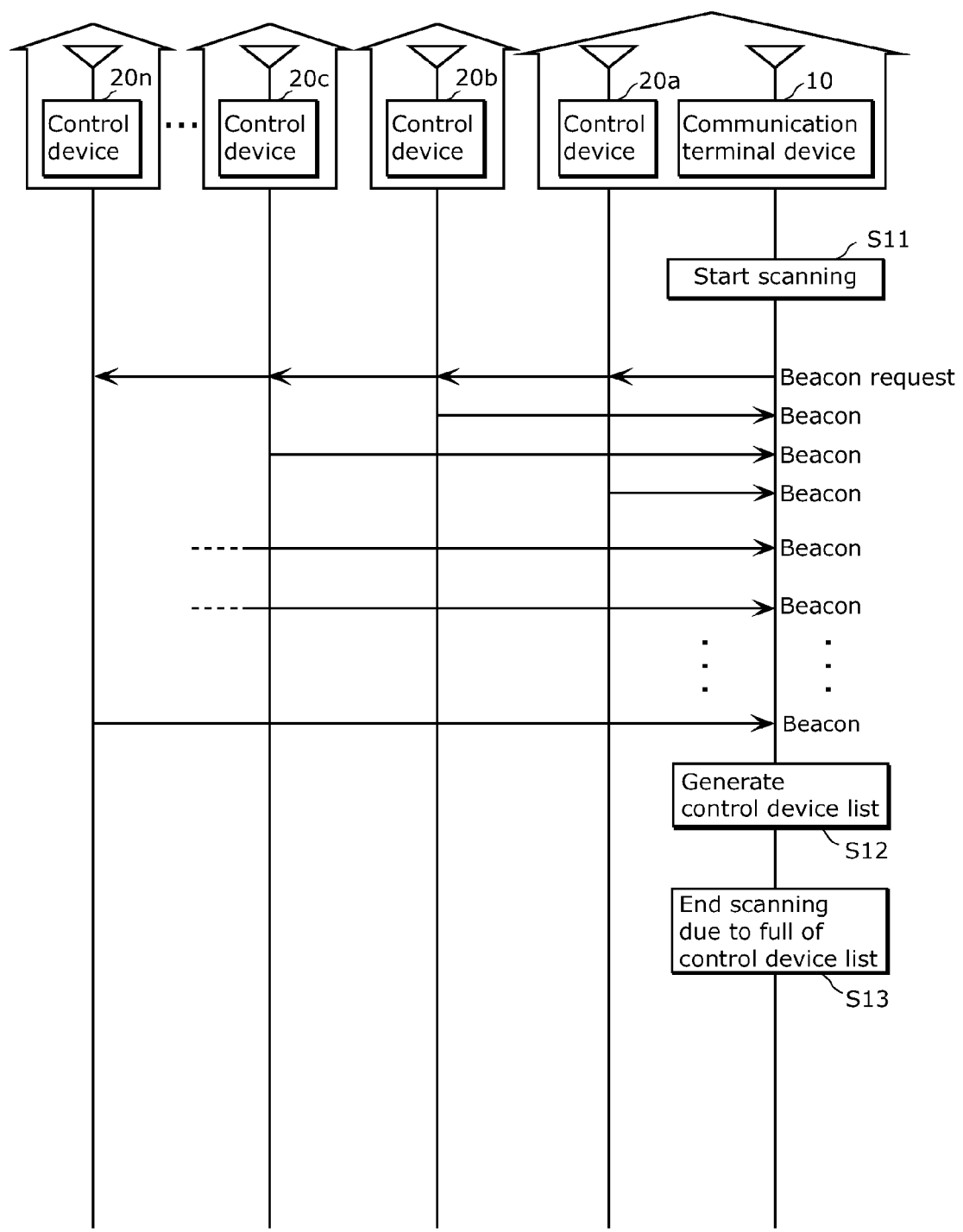
FIG. 3 is a sequence diagram indicating an example of operation between the control device and the communication terminal device when scanning is performed by the communication terminal device.
Figure 4:
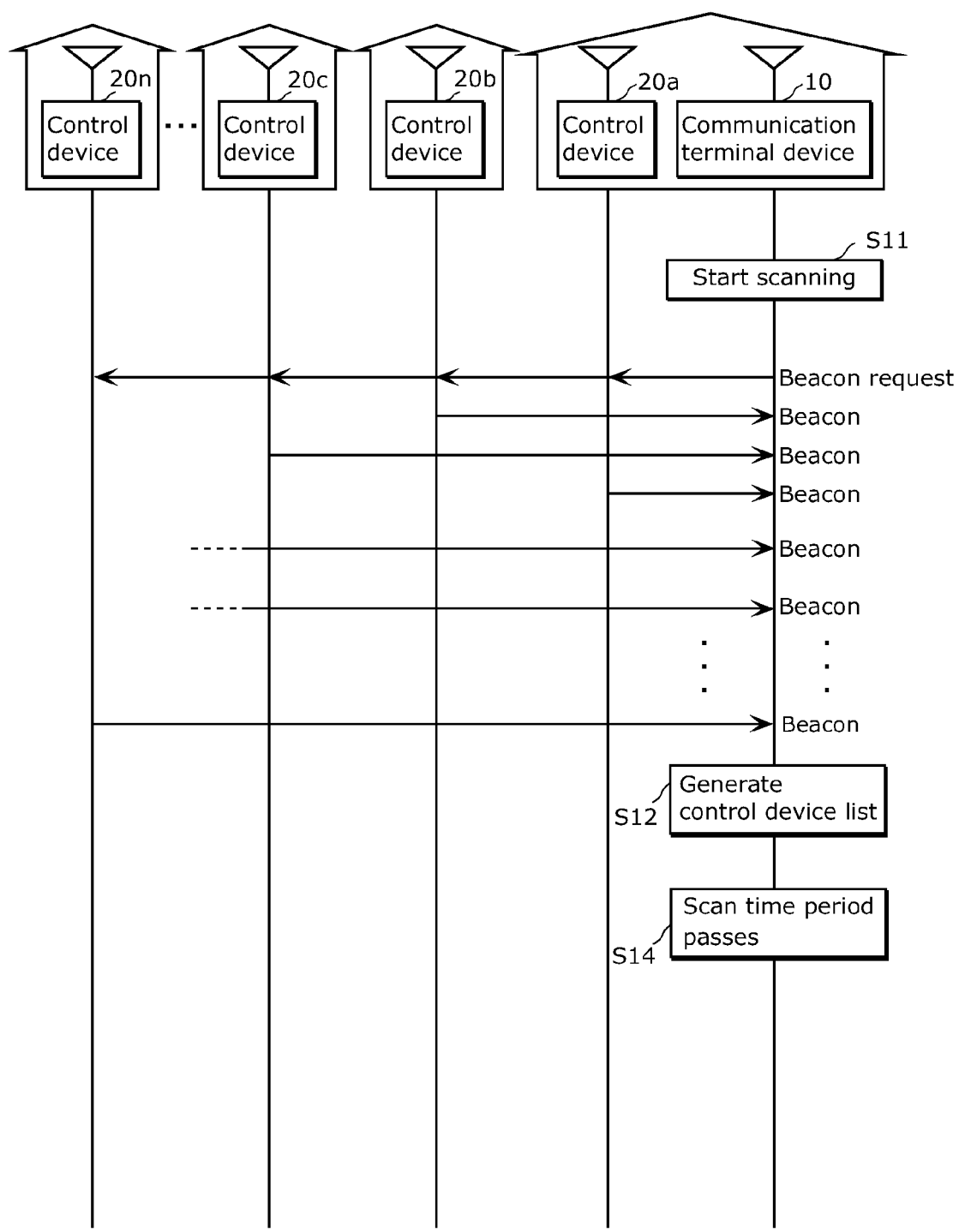
FIG. 4 is a sequence diagram indicating an example of operation between the control device and the communication terminal device when scanning is performed by the communication terminal device.

FIG. 3 and FIG. 4 are each a sequence diagram indicating an example of operation between the control device and the communication terminal device when scanning is performed by the communication terminal device. Furthermore, FIG. 5 is a diagram indicating an example of a control device list to be stored in the communication terminal device.

In general, a communication terminal device 10 and control devices 20 (20a, 20b, 20c, . . . 20n) communicate with each other via a single frequency channel selected from a plurality of frequency channels. This is not related to the point described here, and thus detailed description shall be omitted.

When performing registration into the desired (home) control device, the communication terminal device 10 starts scanning to search for the control devices 20 as indicated in FIG. 3 (Step S11). Then, the communication terminal device 10 broadcast-transmits a beacon request. Each control device 20 which has received the beacon request transmits a beacon to notify that the control device 20 exists. When receiving the beacons, the communication terminal device 10 generates a control device list 11 storing a network ID, a device address, and the like of each control device 20 included in each beacon (Step S12). An example of the control device list 11 is indicated in FIG. 5. Here, when a predetermined scan time period passes (a scan timer expires), the communication terminal device 10 ends the scanning (Step S13).

Alternatively, as indicated in FIG. 4, when the control device list becomes full (the receiving buffer becomes full), then the communication terminal device 10 ends the scanning (Step S14).

Here, for example, a network ID is a personal area network (PAN) ID, a service set ID (SSID), or the like.

The device address is, for example, a media access control (MAC) address, a 64-bit extended address, a 16-bit short address, or the like.

After the scanning, the communication terminal device 10 transmits a registration request sequentially to the control devices 20 in the control device list. Furthermore, by receiving a registration response added with information indicating connection permission or connection rejection from each of the control devices 20, the communication terminal device 10 can find the home control device 20 (20a in FIG. 3 and FIG. 4). In this case, if a registration button or the like of the home control device 20 is pressed to make the control device 20 ready for accepting registration, the control device 20 transmits back a registration response indicating connection permission.

Moreover, in wireless communication using a frequency band of, for example, 400 MHz to 920 MHz, which is a radio frequency band lower than 2.4 GHz band, a propagation distance of radio waves is long and a propagation area sometimes has a radius of 100 m or more even in a residential area. Therefore, if there is a large number of control devices in nearby networks (neighbors), it is assumed that beacons are received from one hundred or more control devices. In such a case, the control device list becomes full (the receiving buffer becomes full) before the scanning is completed, and thereby the scanning is terminated before completion.

Thus, the communication terminal device is required to have a receiving buffer having a capacity large enough to receive beacons from one hundred or more control devices, in other words, a large-capacity memory. Furthermore, the communication terminal device is required to find the home control device from one hundred or more control devices, which takes a time for registration.

In order to solve the above problem, a control device according to an aspect of the present invention is a control device that executes registration processing including transmitting a beacon signal in response to a beacon request transmitted from a communication terminal device to register the communication terminal device as a target to be controlled via wireless communication. The control device includes: a receiving unit configured to receive a first beacon request for performing the registration processing from the communication terminal device; a detection unit configured to detect a control signal indicating a request for starting the registration processing; a registration control unit configured to start the registration processing when the detection unit detects the control signal and execute the registration processing for a certain period; and a transmission control unit configured to: transmit the beacon signal for notifying presence of the control device when the receiving unit receives the first beacon request in a period during which the registration control unit is executing the registration processing; and avoid transmitting the beacon signal when the first beacon request is received in a period during which the registration control unit is not executing the registration processing.

Thus, even when there is a large number of control devices in nearby networks, the communication terminal device desired to be registered into the home control device as a target to be controlled can receive the beacon signal only from the home control device which is executing the registration processing. Accordingly, the communication terminal device can search for the home control device and cause the home control device to register the communication terminal device as a target to be controlled, without a large-capacity memory. Furthermore, the communication terminal device can find the home control device more efficiently and thus shorten the time taken for registration.

Furthermore, the registration control unit may be configured to register the communication terminal device as the target to be controlled when the receiving unit receives a registration request transmitted from the communication terminal device in response to the beacon signal after the beacon signal is transmitted to the communication terminal device in a period during which the registration control unit is executing the registration processing.

Thus, the control device can register the communication terminal device as a target to be controlled.

Furthermore, the transmission control unit may be configured to transmit the beacon signal even in a period during which the registration control unit is not executing the registration processing when the receiving unit receives the first beacon request transmitted from the other control device.

Thus, the control device can transmit a beacon signal to every beacon request from the other control device, and the other control device can understand statuses of the nearby networks (control devices).

Furthermore, the first beacon request may include distinguishing information for distinguishing whether the first beacon request is transmitted from the other control device or the communication terminal device, the control device may further comprise a distinguishing unit configured to distinguish whether the first beacon request is transmitted from the control device or the communication terminal device based on the distinguishing information, and the transmission control unit may be configured to transmit the beacon signal even in a period during which the registration control unit is not executing the registration processing when the distinguishing unit distinguishes that the first beacon request is transmitted from the control device.

Thus, the control device can control transmission of beacon signals depending on whether the first beacon request has been transmitted from the control device or the communication terminal device.

Furthermore, the transmission control unit may be configured to transmit the beacon signal even in a period during which the registration control unit is not executing the registration processing when the receiving unit receives a second beacon request complying with a predetermined standard from the communication terminal device or the other control device.

This allows supporting the communication terminal device complying with the standard and transmits the second beacon request, and performing processing according to both the first beacon request and the second beacon request.

Furthermore, the second beacon request may be a beacon request frame complying with Institute of Electrical and Electronics Engineers (IEEE) 802.15.4, and the beacon signal may be a beacon frame complying with IEEE 802.15.4.

Furthermore, the second beacon request may be a probe request frame complying with IEEE 802.11, and the beacon signal may be a probe response frame complying with IEEE 802.11.

Furthermore, the control device may further include a measurement unit configured to measure a received field strength of the beacon request received by the receiving unit, wherein the transmission control unit may be configured to transmit the beacon signal when the received field strength is greater than or equal to a specific threshold.

Thus, for example when a communication terminal device is to be registered into a home control device, transmission of a beacon can be limited according to the received field strength of a beacon request even when the other control device is in the registration mode.

Furthermore, the transmission control unit may be configured to transmit the beacon signal in the case where the detection unit detects the control signal again within a predetermined period after a period during which the registration control unit is executing the registration processing and when the received field strength is smaller than a specific threshold.

Thus, even when the received field strength of the beacon from the home control device is low for some reasons, the home control device is not missed in the search by the communication terminal device thanks to the registration processing again, which allows the communication terminal device to be registered.

It is to be noted that general or specific aspects of the above may be provided by a system, a method, an integrated circuit, a computer program, or a computer-readable recording medium such as a CD-ROM, and an arbitrary combination of a system, a method, an integrated circuit, a computer program, and a recording medium.

Hereinafter, embodiments are described with reference to the Drawings.

It is to be noted that embodiments described below are each a comprehensive or specific example of the present invention. The numerical values, shapes, constituent elements, the arrangement and connection of the constituent elements, steps, the processing order of the steps etc. shown in the following embodiment are mere examples, and thus do not limit the present invention. Furthermore, out of the constituent elements in the following embodiment, the constituent elements not stated in the independent claims describing the broadest concept of the present invention are described as optional constituent elements.

(Embodiment 1)

Figure 6:
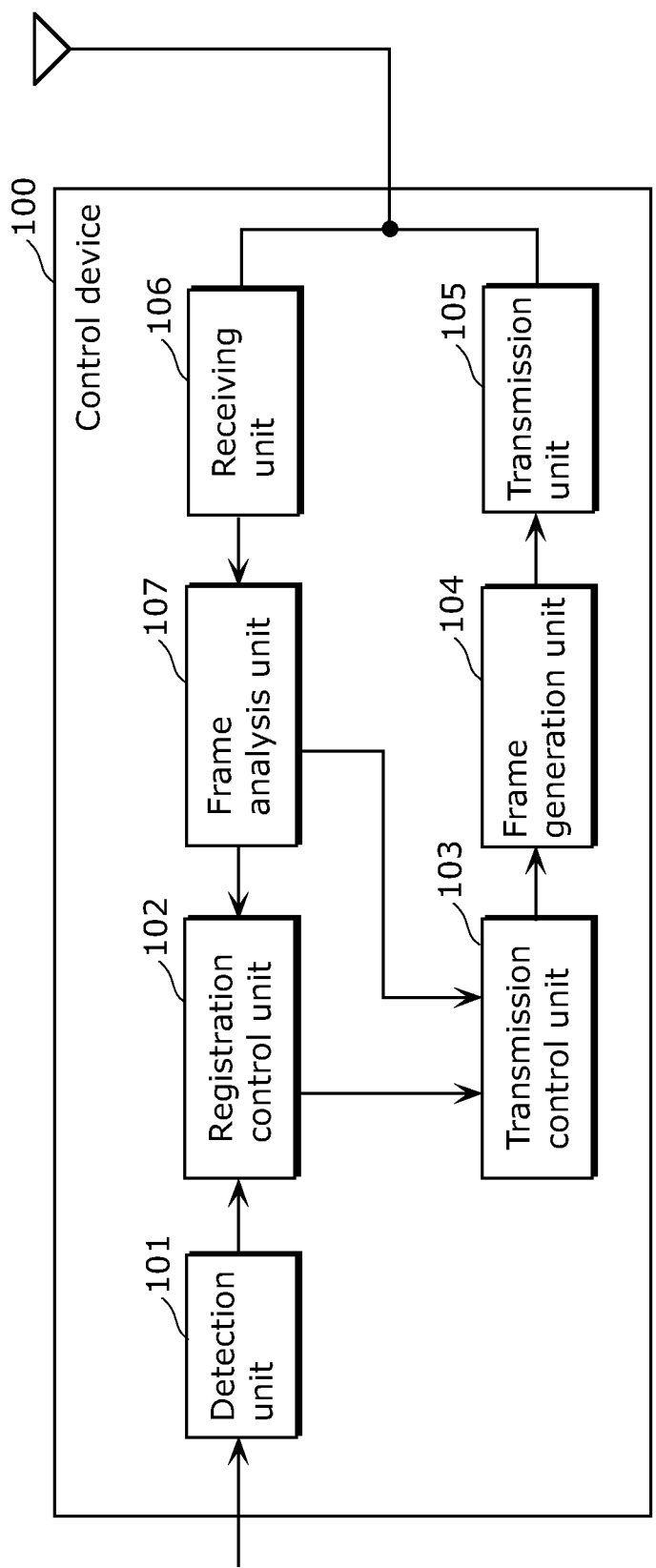
FIG. 6 is a block diagram illustrating a structure of the control device according to Embodiment 1.

FIG. 6 is a block diagram indicating a structure of a control device according to Embodiment 1.

The control device 100 is a device that executes registration processing including transmitting a beacon signal in response to a beacon request transmitted from a communication terminal device to register the communication terminal device as a target to be controlled via wireless communication. As illustrated in FIG. 6, the control device 100 includes a detection unit 101, a registration control unit 102, a transmission control unit 103, a frame generation unit 104, a transmission unit 105, a receiving unit 106, and a frame analysis unit 107.

Here, the communication terminal device is one of a home appliance such as a refrigerator, a microwave, a washing machine, or an air conditioner, and an energy-related device such as a distribution board, a power meter, a gas meter, a solar panel, a heat pump, a storage battery, or a fuel battery. The communication terminal device may be attached to the home appliance or the energy-related device. Furthermore, the control device 100 performs various kinds of control on the communication terminal device registered as a target to be controlled.

Figure 1:
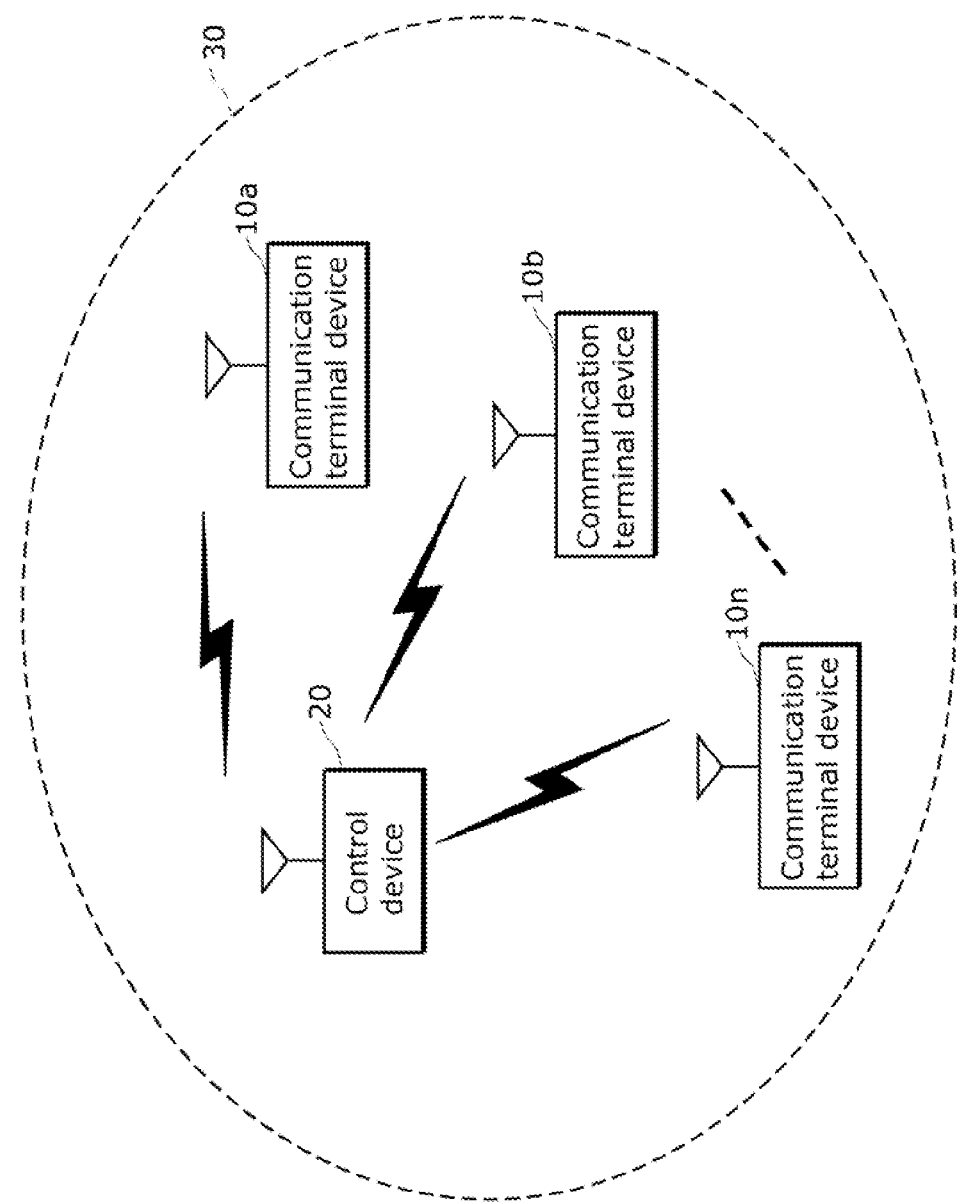
FIG. 1 is a schematic diagram illustrating an example of a structure of a network.
Figure 2:
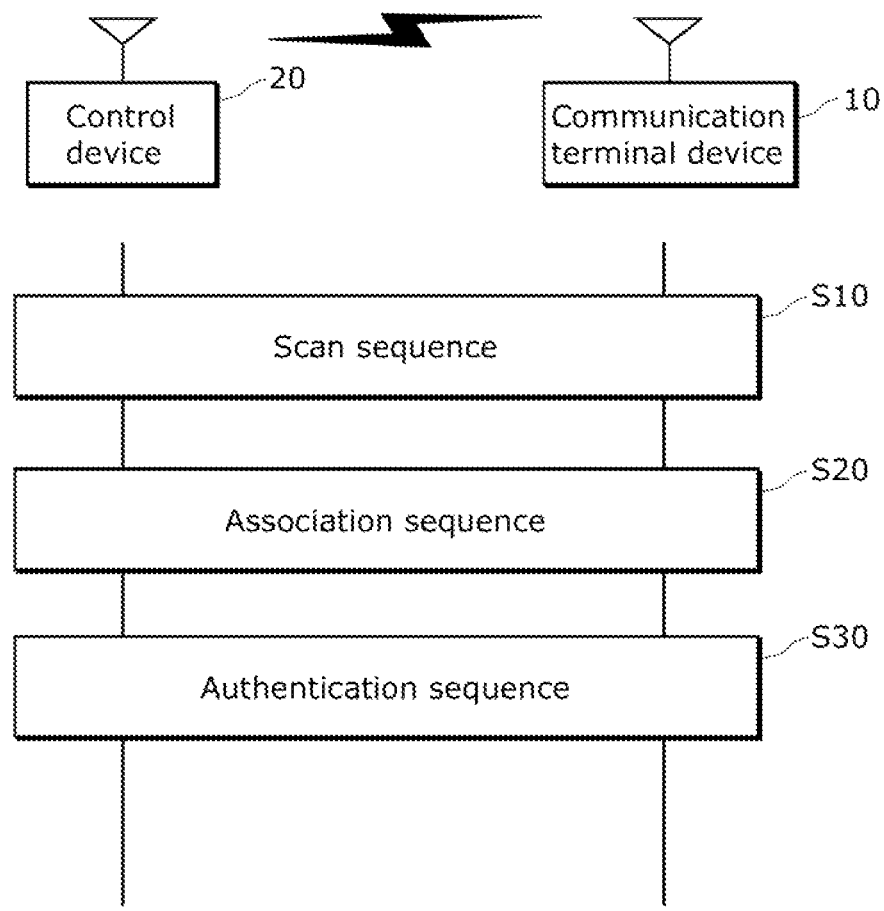
FIG. 2 is a schematic diagram of a flow for registering, as a target to be controlled, a communication terminal device into a control device.

The control device 100 is used in, for example, the same network configuration as illustrated in FIG. 1.

The detection unit 101 detects a control signal requesting to start registration processing for registering the communication terminal device into the control device 100 as a new target to be controlled, and notifies the registration control unit 102 of the control signal. This control signal indicating a request for starting registration processing is sent when a user operation is performed on the control device 100, for example when a registration button or the like is pressed or when an instruction is issued from a smartphone or the like.

When the detection unit 101 detects the control signal, the registration control unit 102 starts registration processing and executes the registration processing for a certain period. Specifically, for the certain period, the registration control unit 102 is ready to accept registration of a new target to be controlled (hereinafter referred also to be in a "registration mode"). When the certain period passes or the registration of the communication terminal device as a target to be controlled is completed, the registration control unit 102 ends to be ready to accept registration (be in the registration mode).

Furthermore, if the registration control unit 102 is in the registration mode when the registration request from the communication terminal device is received, the registration control unit 102 instructs the transmission control unit 103 to transmit the registration response added with information indicating connection permission. The registration request requests to cause the control device 100 to register the communication terminal device as a target to be controlled. Furthermore, if the registration control unit 102 is not in the registration mode when the registration request from the communication terminal device is received, the registration control unit 102 instructs the transmission control unit 103 to transmit the registration response added with information indicating connection rejection.

When the receiving unit 106 receives the beacon request (hereinafter referred to also as a "beacon request") when the control device 100 is in the registration mode, the transmission control unit 103 performs control to cause the transmission unit 105 to broadcast-transmit (simultaneously transmit) the beacon signal (hereinafter referred to also as a "beacon") including the network ID and the device address of the control device 100. Furthermore, when the receiving unit 106 receives the beacon request when the control device 100 is not in the registration mode, the transmission control unit 103 performs control not to transmit the beacon.

The frame generation unit 104 generates a frame of a beacon according to instructions from the transmission control unit 103. The transmission unit 105 broadcast-transmits the frame of the beacon which has been generated by the frame generation unit 104.

The receiving unit 106 receives, from the communication terminal device, a beacon request for transmitting a beacon and a registration request, for example. The frame analysis unit 107 analyzes the beacon request and the registration request received by the receiving unit 106, and retrieves from the beacon request and the registration request a predetermined parameter such as a network ID and a device address for identifying the communication terminal device.

Next, operation performed by the control device 100 having the above-described structure is described.

Figure 7:
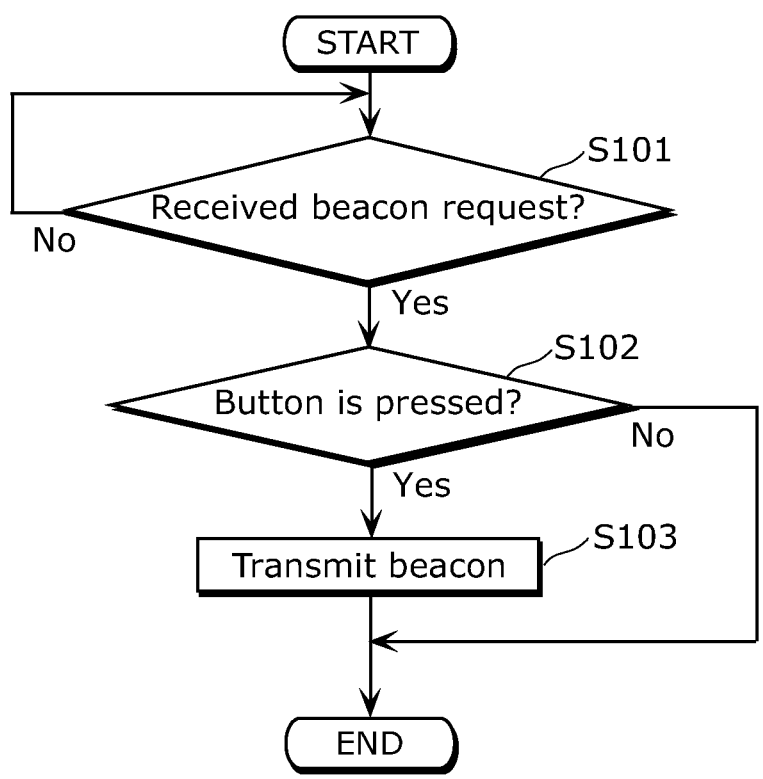
FIG. 7 is a flowchart indicating a flow of operation according to Embodiment 1.

FIG. 7 is a flowchart indicating a flow of operation according to Embodiment 1.

The transmission control unit 103 determines whether or not the receiving unit 106 has received a beacon request (Step S101). Here, when the beacon request has been received (Yes in Step S101), the transmission control unit 103 determines whether or not a registration button or the like is pressed and the control device 100 is in the registration mode (hereinafter simply referred to also as "button is pressed") (Step S102). Here, when the result shows the registration mode (Yes in Step S102), the transmission control unit 103 performs control to broadcast-transmit the beacon (Step S103). Specifically, the transmission control unit 103 instructs the frame generation unit 104 and the transmission unit 105 to broadcast-transmit the beacon.

On the other hand, when the result does not show the registration mode (No in Step S102), the transmission control unit 103 performs control not to transmit the beacon.

Furthermore, when the beacon request has not been received (No in Step S101), the transmission control unit 103 repeats the determination processing on whether or not the beacon request has been received (Step S101).

Figure 8:
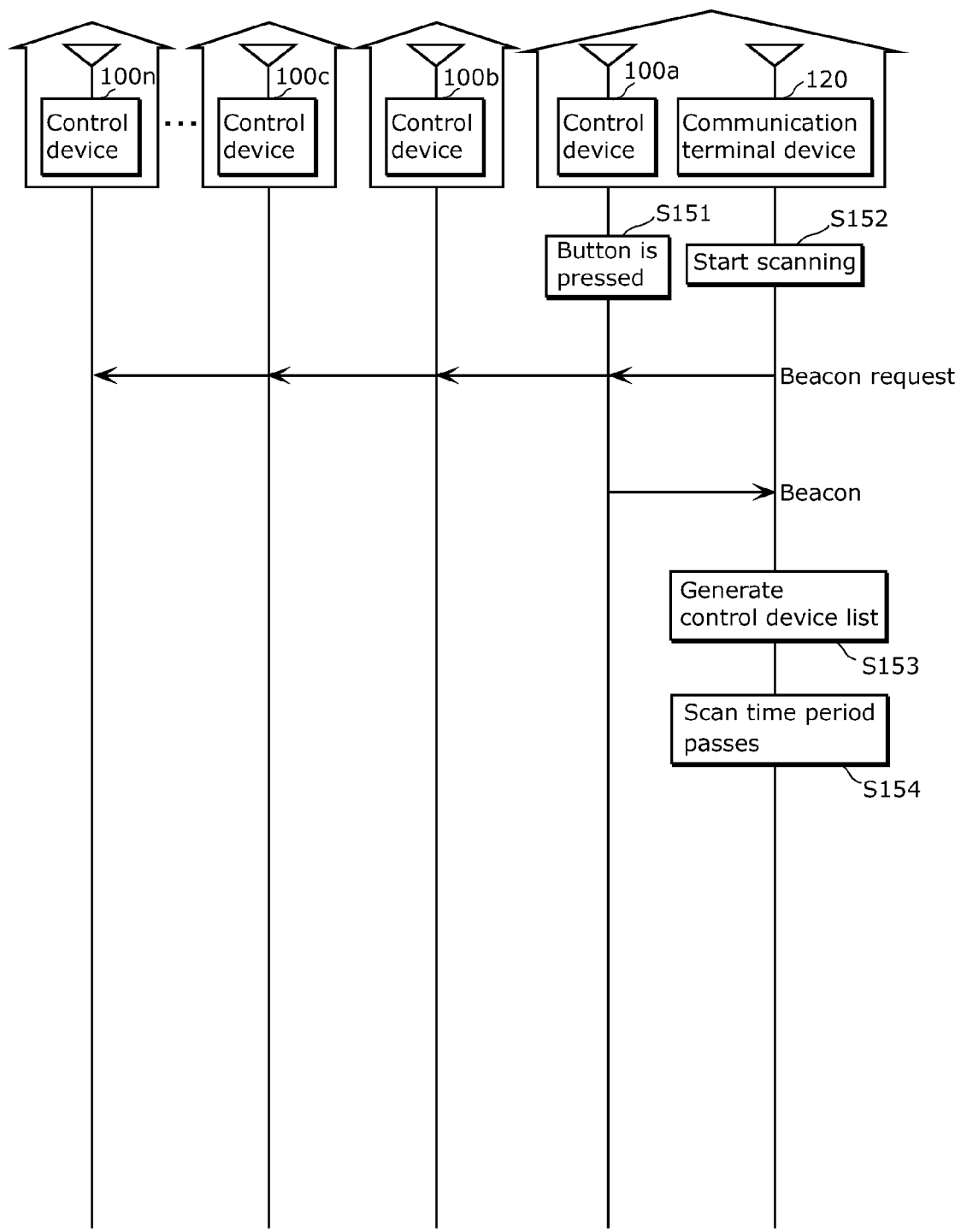
FIG. 8 is a sequence diagram indicating an example of specific operation in scanning according to Embodiment 1.

FIG. 8 is a sequence diagram indicating an example of specific operation in scanning according to Embodiment 1. To simplify the explanation, the sequence diagram in FIG. 8 does not include all of the operations in the flowchart indicated in FIG. 7. Furthermore, in FIG. 8, the home control device is designated as a control device 100a among the control devices 100 (100a, 100b, 100c, . . . 100n).

In FIG. 8, the home control device 100a turns to the registration mode when the registration button or the like is pressed to register the communication terminal device 120 as a target to be controlled (Step S151). Next, when the registration button or the like of the communication terminal device 120 is pressed, scanning is started (Step S152). Thus, the communication terminal device 120 broadcast-transmits the beacon request. In the scanning, the communication terminal device searches a plurality of control devices including control devices in nearby networks in neighbors and the like for a desired control device (a home control device) to be connected.

Here, when the control device 100a is in the registration mode, the receiving unit 106 receives the beacon request. Therefore, the control device 100a broadcast-transmits the beacon. The communication terminal device 120 which has received the beacon transmitted from the control device 100a retrieves the network ID and the device address from the beacon. The retrieved network ID and the device address are stored into the control device list (Step S153). Then, at the communication terminal device 120, scan time period passes (Step S154).

At this time, not only the home control device 100a but also the other control devices 100b, 100c, . . . 100n receive the beacon request transmitted from the communication terminal device 120. However, since the registration buttons or the like of the other control devices 100b, 100c, . . . 100n are not pressed (not in the registration mode), beacons are not transmitted.

Thus, the communication terminal device 120 receives only the beacon transmitted from the control device 100a. Specifically, the network ID and the device address of only the control device 100a are stored into the control device list.

After the scanning, the communication terminal device 120 transmits to the control device 100a included in the control device list a registration request for causing the control device 100a to register the communication terminal device 120 as a target to be controlled. Since the home control device 100a which has received the registration request is ready to accept registration (in the registration mode), the home control device 100a transmits a registration response added with information indicating connection permission back to the communication terminal device 120. The communication terminal device 120 can find the home control device 100a by receiving the registration response added with the information indicating connection permission from the control device 100a. After that, the communication terminal device 120 and the control device 100a perform authentication processing on key information or the like, thereby completing the registration.

As described above, in the present embodiment, control is performed to broadcast-transmit the beacon only when the beacon request is received in the registration mode. Thus, even when there is a large number of control devices in nearby networks, the communication terminal device desired to be registered into the home control device as a target to be controlled can receive only the beacon from the home control device. Accordingly, the communication terminal device can search for the home control device and cause the home control device to register the communication terminal device as a target to be controlled, without a large-capacity memory. Furthermore, the communication terminal device can find the home control device more efficiently and thus shorten the time taken for registration.

(Embodiment 1)

Embodiment 1 has described processing performed in response to the beacon request transmitted from the communication terminal device. In contrast, Embodiment 2 describes processing performed in response to the beacon requests transmitted from the other control devices in addition to the communication terminal device. Here, the other control devices transmit beacon requests in order to understand the statuses of nearby networks (control devices). The other control devices obtain various information from beacons transmitted in response to beacon requests from the nearby control devices and understand the statuses of the nearby networks.

Figure 9:
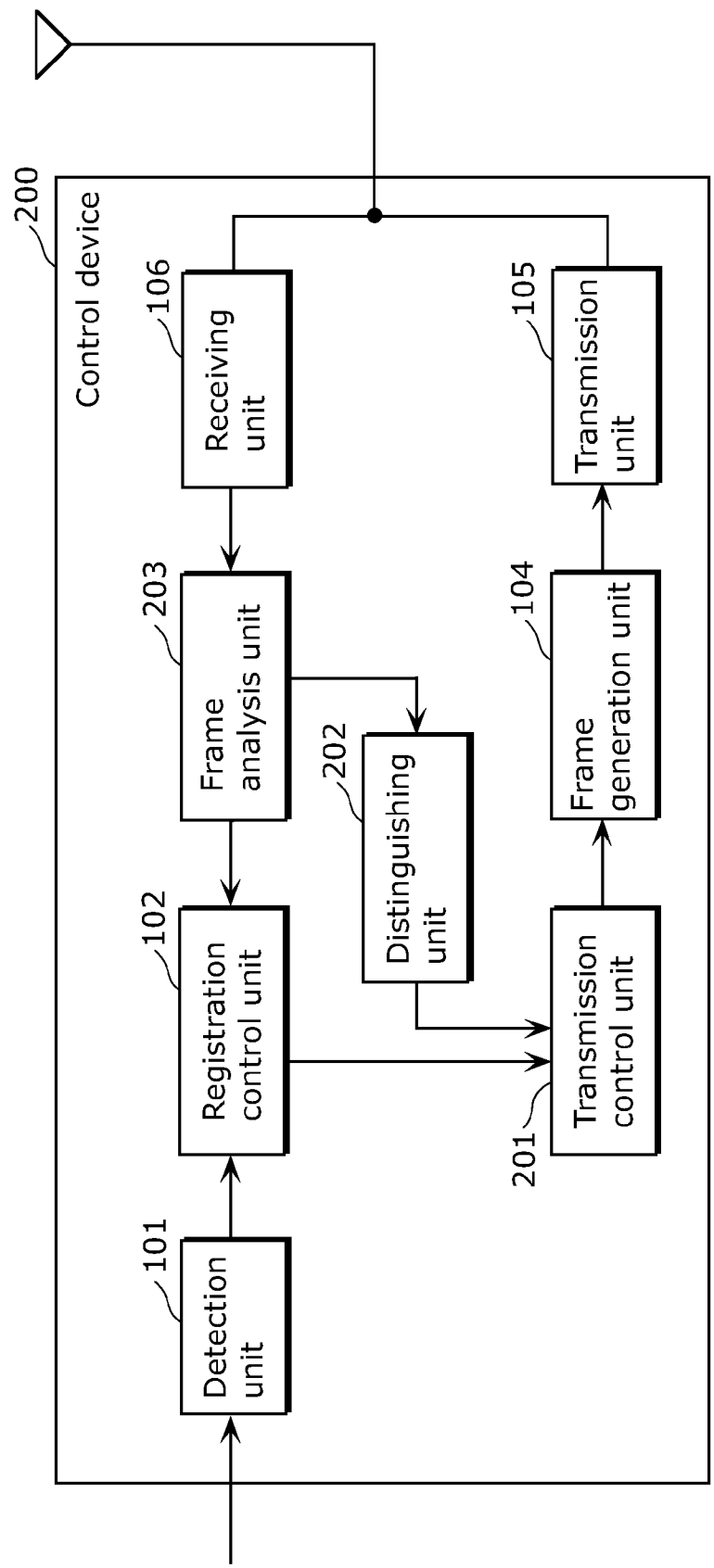
FIG. 9 is a block diagram indicating a structure of a control device according to Embodiment 2.

FIG. 9 is a block diagram indicating a structure of a control device according to Embodiment 2. It is to be noted that constituent elements same as those in Embodiment 1 are represented by the same numerals, and description is omitted.

The control device 200 is a device that executes registration processing including transmitting a beacon signal in response to a beacon request transmitted from a communication terminal device to register the communication terminal device as a target to be controlled via wireless communication. As illustrated in FIG. 9, the control device 200 includes a detection unit 101, a registration control unit 102, a transmission control unit 201, a frame generation unit 104, a transmission unit 105, a receiving unit 106, a distinguishing unit 202, and a frame analysis unit 203.

When the receiving unit 106 has received a beacon request from the communication terminal device when the control device 200 is in the registration mode, the transmission control unit 201 performs control to cause the transmission unit 105 to broadcast-transmit a beacon including the network ID and the device address of the control device 200. Furthermore, when the receiving unit 106 has received the beacon request from the communication terminal device when the control device 200 is not in the registration mode, the transmission control unit 103 performs control to cause the transmission unit 105 not to transmit the beacon.

Furthermore, when the receiving unit 106 has received the beacon request from the other control device, the transmission control unit 201 performs control to cause the transmission unit 105 to broadcast-transmit the beacon every time, i.e., irrespective of whether the control device 200 is in the registration mode or not. In other words, when the receiving unit 106 has received the beacon request from the other control device, the transmission control unit 201 performs control to cause the transmission unit 105 to broadcast-transmit the beacon even not in the registration mode.

The frame analysis unit 203 analyzes the beacon request and the registration request received by the receiving unit 106, and retrieves from the beacon request and the registration request a predetermined parameter such as a network ID and a device address for identifying the communication terminal device. Furthermore, the frame analysis unit 203 analyzes the beacon request received by the receiving unit 106 and retrieves distinguishing information included in the beacon request. The distinguishing information is for distinguishing whether the device which has transmitted the beacon request is the control device or the communication terminal device.

For example, a candidate of the distinguishing information may be the frame type or the frame version of the frame control field of the MAC header of the beacon request defined in IEEE802.15.4. Alternatively, a flag or the like may be added to the MAC payload field as the distinguishing information.

The distinguishing unit 202 distinguishes whether the device which has transmitted the beacon request is a control device or a communication terminal device, based on the distinguishing information retrieved by the frame analysis unit 203.

In the present embodiment, the control device and the communication terminal device which transmit the beacon requests add the distinguishing information to the beacon request by themselves. The distinguishing information includes a flag or the like indicating whether the device is the control device or the communication terminal device.

Next, operation performed by the control device 200 having the above-described structure is described.

Figure 10:
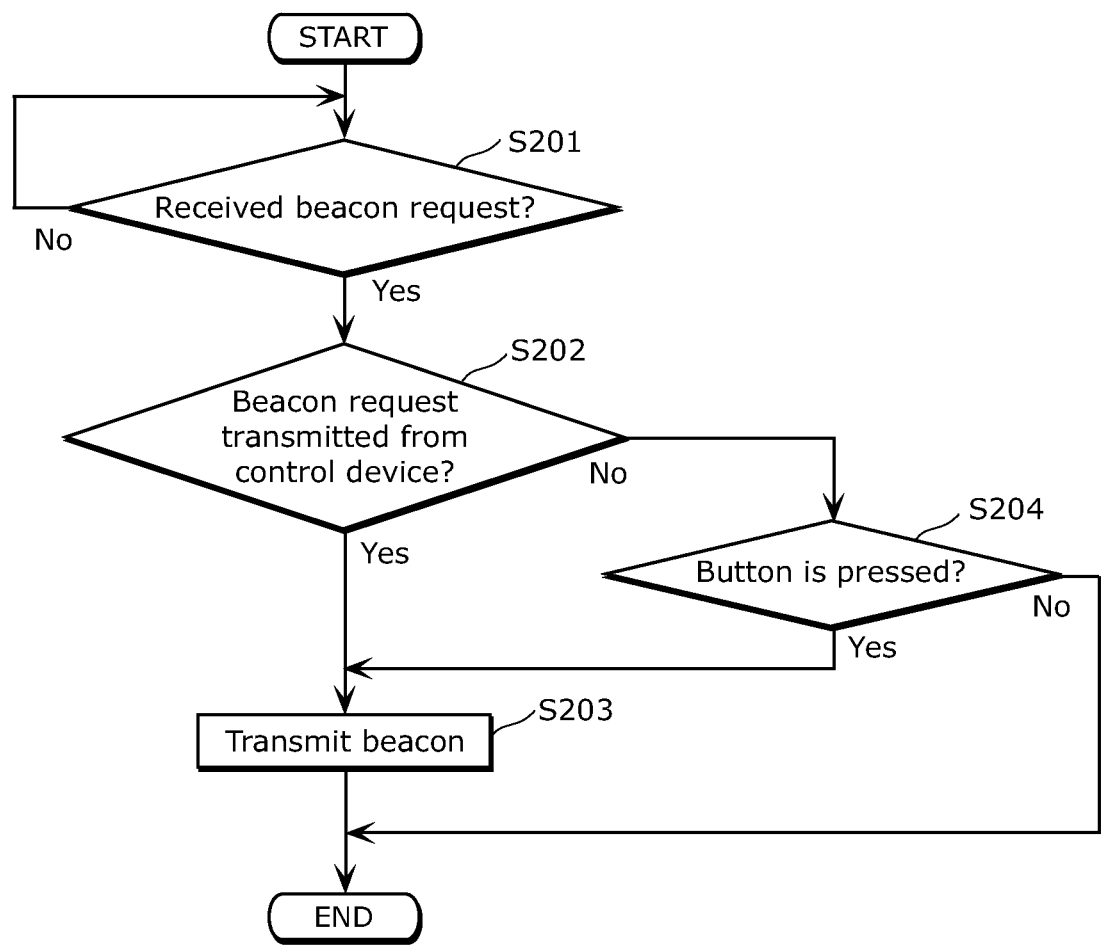
FIG. 10 is a flowchart indicating a flow of operation according to Embodiment 2.

FIG. 10 is a flowchart indicating a flow of operation according to Embodiment 2.

The transmission control unit 201 determines whether or not the receiving unit 106 has received a beacon request (Step S201). Here, when the beacon request has been received (Yes in Step S201), the distinguishing unit 202 distinguishes whether the device which has transmitted the beacon request is the control device or the communication terminal device, based on the distinguishing information retrieved by the frame analysis unit 203. Here, when the device which has transmitted the beacon request is the control device (Yes in Step S202), the transmission control unit 201 performs control to cause the transmission unit 105 to broadcast-transmit the beacon (Step S203). Specifically, the transmission control unit 201 instructs the frame generation unit 104 and the transmission unit 105 to broadcast-transmit the beacon.

On the other hand, when the device which has transmitted the beacon request is not the control device, that is the communication terminal device (No in Step S202), the transmission control unit 201 determines whether or not the registration button of the control device 200 is pressed and the control device 200 is in the registration mode (Step S204). Here, when the result shows the registration mode (Yes in Step S204), the transmission control unit 201 performs control to broadcast-transmit the beacon (Step S203). When the result does not show the registration mode (No in Step S204), the transmission control unit 201 performs control not to transmit the beacon.

Furthermore, when the beacon request has not been received (No in Step S201), the transmission control unit 201 repeats the determination processing on whether or not the beacon request has been received (Step S201).

Figure 11:
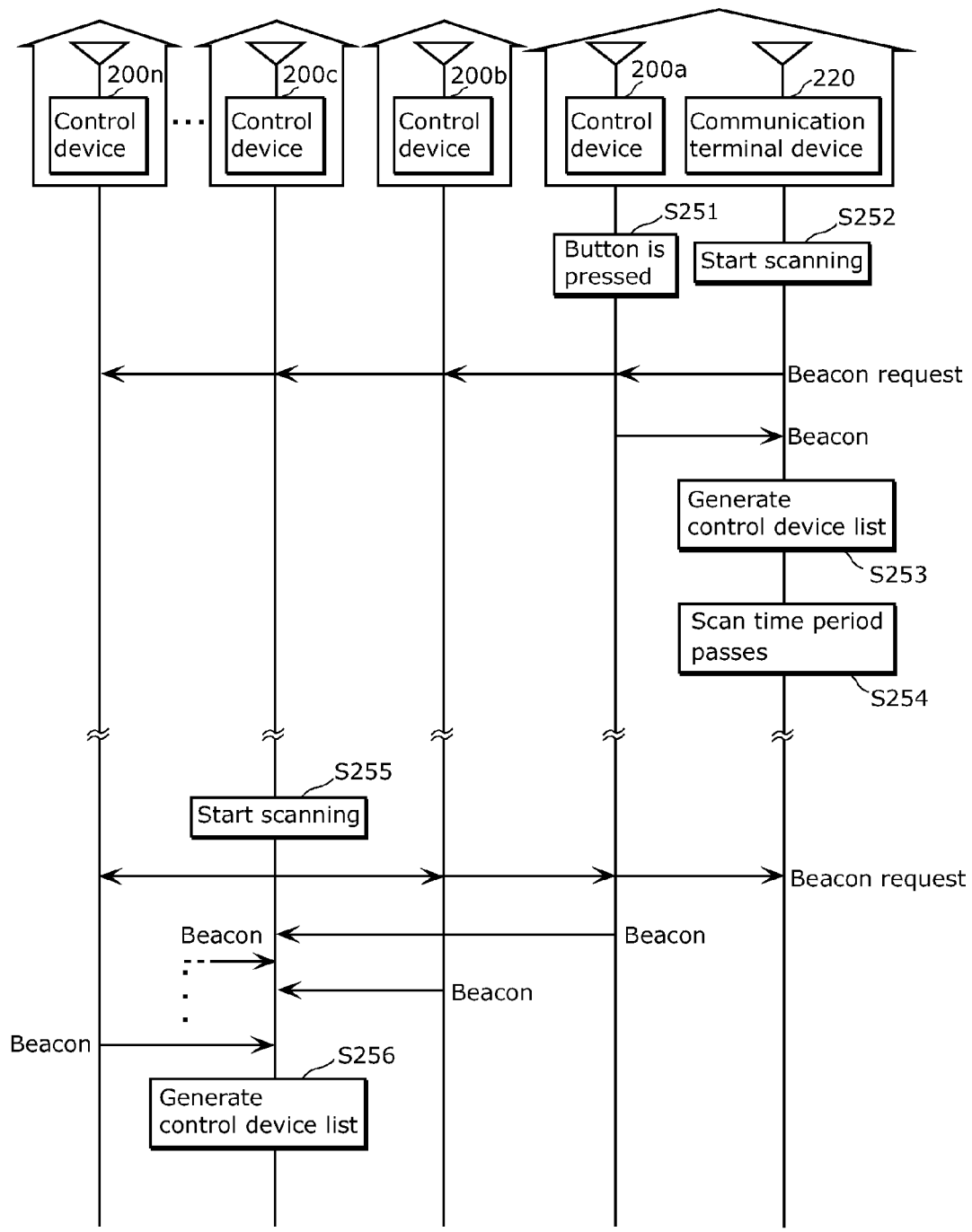
FIG. 11 is a sequence diagram of an example of specific operation in the scanning according to Embodiment 2.

FIG. 11 is a sequence diagram indicating an example of specific operation in scanning according to Embodiment 2. To simplify the explanation, the sequence diagram in FIG. 11 does not include all of the operations in the flowchart indicated in FIG. 10. Furthermore, in FIG. 11, the home control device is designated as a control device 200a among the control devices 200 (200a, 200b, 200c, . . . 200n).

In FIG. 11, the home control device 200a turns to the registration mode when the registration button or the like is pressed to register the communication terminal device 220 as a target to be controlled (Step S251). Next, when the registration button or the like of the communication terminal device 220 is pressed, scanning is started (Step S252). Thus, the communication terminal device 220 broadcast-transmits the beacon request. In the scanning, the communication terminal device searches a plurality of control devices including control devices in nearby networks in neighbors and the like for a desired control device (a home control device) to be connected.

Here, when the control device 200a is in the registration mode, the receiving unit 106 receives the beacon request from the communication terminal device 220. Therefore, the control device 200a broadcast-transmits the beacon. When receiving the beacon transmitted from the control device 200a, the communication terminal device 220 retrieves the network ID and the device address from the beacon. The retrieved network ID and the device address are stored into the control device list (Step S253). Then, at the communication terminal device 220, scan time period passes (Step S254).

At this time, not only the home control device 200a but also the other control devices 200b, 200c, . . . 200n receive the beacon request transmitted from the communication terminal device 220. However, since the registration buttons or the like of the other control devices 200b, 200c, . . . 200n are not pressed (not in the registration mode), beacons are not transmitted.

Thus, the communication terminal device 220 receives only the beacon transmitted from the control device 200a.

Specifically, the network ID and the device address of only the control device 200a are stored into the control device list.

After the scanning, the communication terminal device 220 transmits to the control device 200a included in the control device list a registration request for causing the control device 200a to register the communication terminal device 220 as a target to be controlled. Since the home control device 200a which has received the registration request is ready to accept registration (in the registration mode), the home control device 200a transmits back to the communication terminal device 220 a registration response added with information indicating connection permission. The communication terminal device 220 can find the home control device 200a by receiving the registration response added with the information indicating connection permission from the control device 200a. After that, the communication terminal device 220 and the control device 200a perform authentication processing on key information or the like, thereby completing the registration.

On the other hand, at the control device 200c for example, scanning is started to understand the statuses of the nearby networks (Step S255). Thus, the control device 200c broadcast-transmits the beacon request. In FIG. 11, when the control device 200a is not in the registration mode, the receiving unit 106 receives the beacon request from the control device 200c.

Since the beacon request has been transmitted from the control device, the control device 200a broadcast-transmits the beacon in response to the beacon request from the control device 200c, even not in the registration mode.

The control device 200c receives the beacons transmitted from the control devices 200a, 200b, . . . 200n. The control device 200c retrieves from the beacon the network ID and the device address, for example. The retrieved network ID and the device address are stored into the control device list (Step S256). Thus, the control device 200c can obtain various information such as the network IDs and the device addresses of the other control devices to understand the statuses of the nearby networks (control devices).

As described above, in the present embodiment, when the device which has transmitted the beacon request is a communication terminal device, control is performed to broadcast-transmit the beacon only in the registration mode. Thus, even when there is a large number of control devices in nearby networks, the communication terminal device desired to be registered into the home control device as a target to be controlled can receive the beacon only from the home control device. Accordingly, the communication terminal device can search for the home control device and cause the home control device to register the communication terminal device as a target to be controlled, without a large-capacity memory. Furthermore, the communication terminal device can find the home control device more efficiently and thus shorten the time taken for registration.

Furthermore, in the present embodiment, when the device which has transmitted the beacon request is a control device, control is performed to transmit the beacon every time. Thus, the other control devices can understand the statuses of the nearby networks (control devices).

(Embodiment 3)

Embodiment 1 has described processing performed in response to one kind of beacon request transmitted from the communication terminal device. In contrast, Embodiment 3 describes processing performed in response to two kinds of the beacon requests transmitted from the communication terminal device.

Figure 12:
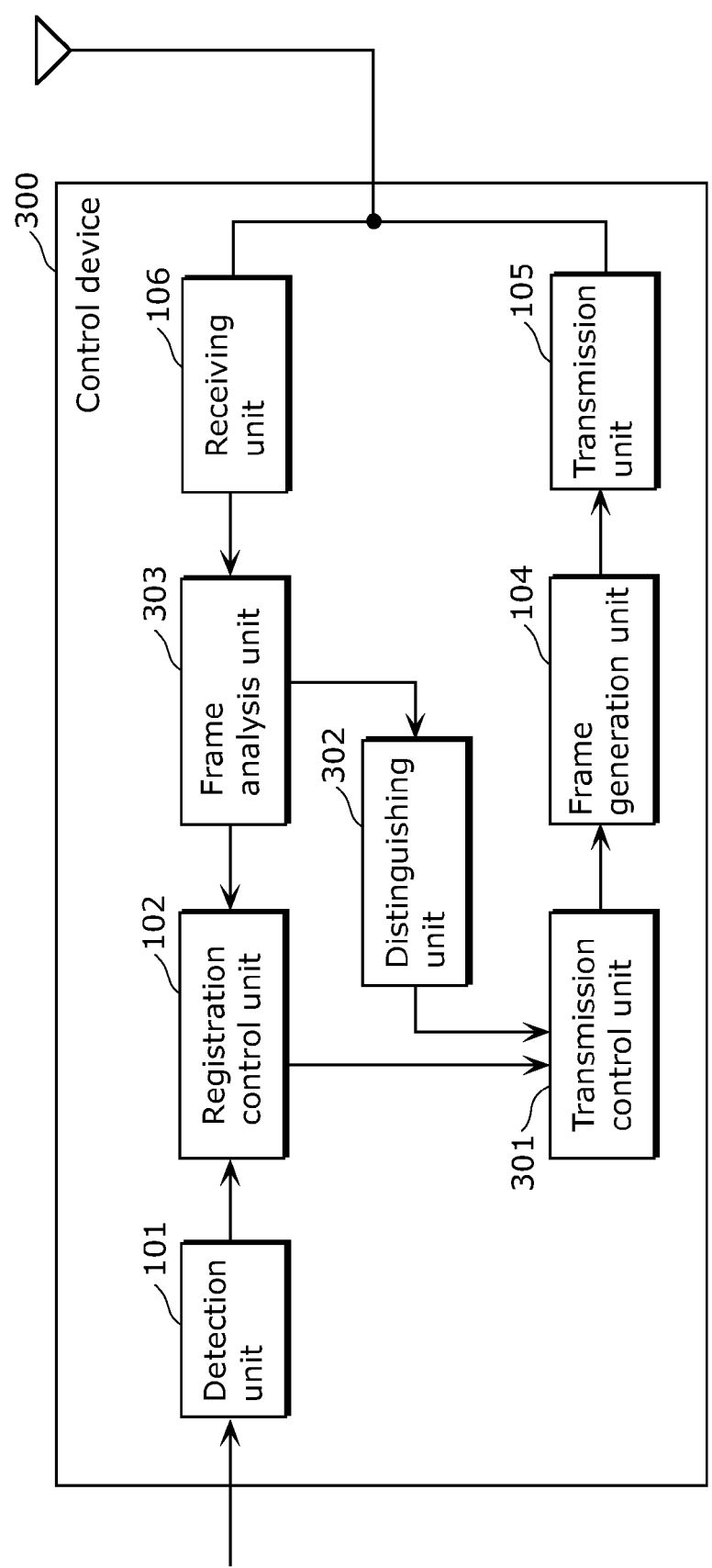
FIG. 12 is a block diagram indicating a structure of a control device according to Embodiment 3.

FIG. 12 is a block diagram indicating a structure of a control device according to Embodiment 3. It is to be noted that constituent elements same as those in Embodiment 1 are represented by the same numerals, and description is omitted.

The control device 300 is a device that executes registration processing including transmitting a beacon signal in response to a beacon request transmitted from a communication terminal device to register the communication terminal device as a target to be controlled via wireless communication. As illustrated in FIG. 12, the control device 300 includes a detection unit 101, a registration control unit 102, a transmission control unit 301, a frame generation unit 104, a transmission unit 105, a receiving unit 106, a distinguishing unit 302, and a frame analysis unit 303.

The frame analysis unit 303 analyzes the beacon request and the registration request received by the receiving unit 106, and retrieves from the beacon request and the registration request a predetermined parameter such as a network ID and a device address for identifying the communication terminal device. Furthermore, the frame analysis unit 303 analyzes the beacon request received by the receiving unit 106 and retrieves distinguishing information. The distinguishing information is for distinguishing whether the beacon request is a first beacon request or a second beacon request.

The distinguishing unit 302 distinguishes whether the beacon request is the first beacon request or the second beacon request based on the distinguishing information retrieved by the frame analysis unit 303. Here, the first beacon request is a beacon request transmitted from a specific communication terminal device and the second beacon request is a beacon request transmitted from a communication terminal device which is complying with general standards and is different from the specific communication terminal device.

For example, the beacon request may be distinguished as the first beacon request by applying a value other than the values defined in 802.15.4. to the frame type or the frame version of the frame control field of the MAC header of the first beacon request.

In the present embodiment, distinguishing information such as a flag indicating that the beacon request is the first beacon request is added to the first beacon request. Alternately, distinguishing information such as a flag indicating whether the beacon request is the first beacon request or the second beacon request may be added to each of the beacon requests.

When the receiving unit 106 has received the first beacon request from the communication terminal device when the control device 300 is in the registration mode, the transmission control unit 301 performs control to broadcast-transmit a beacon including the network ID and the device address of the control device 300. Furthermore, when the receiving unit 106 has received the first beacon request from the communication terminal device when the control device 300 is not in the registration mode, the transmission control unit 301 performs control not to transmit the beacon.

Furthermore, when the receiving unit 106 has received the second beacon request from the communication terminal device, the transmission control unit 301 performs control to broadcast-transmit the beacon every time, i.e., irrespective of whether the control device 300 is in the registration mode or not. In other words, when the receiving unit 106 has received the second beacon request, the transmission control unit 301 performs control to broadcast-transmit the beacon even when the control device 300 is not in the registration mode.

Next, operation performed by the control device 300 having the above-described structure is described.

Figure 13:
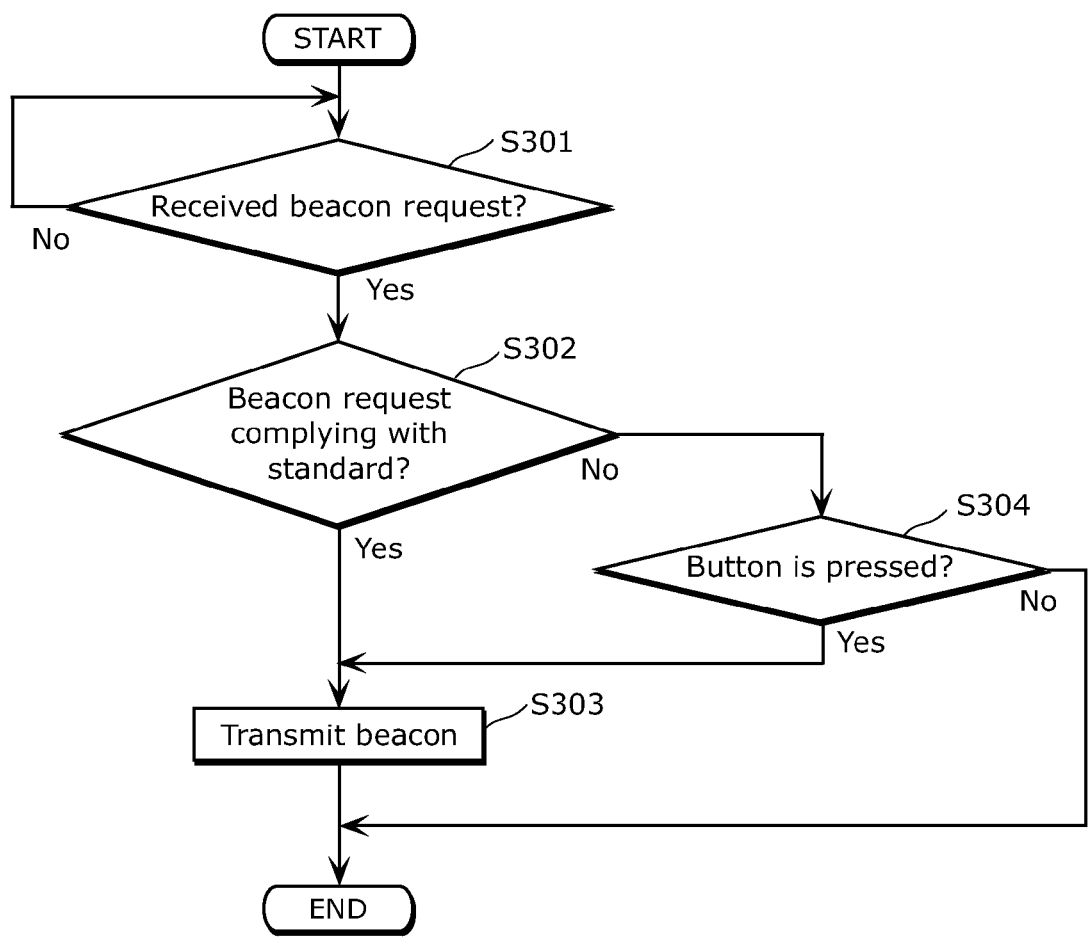
FIG. 13 is a flowchart indicating a flow of operation according to Embodiment 3.

FIG. 13 is a flowchart indicating a flow of operation according to Embodiment 3.

The transmission control unit 301 determines whether or not the receiving unit 106 has received a beacon request (Step S301). Here, when the beacon request has been received (Yes in Step S301), the distinguishing unit 302 distinguishes whether the beacon request is the second beacon request (complying with the standard), based on the distinguishing information retrieved by the frame analysis unit 303 (Step S302). Here, when the beacon request is the second beacon request (complying with the standard) (Yes in Step S302), the transmission control unit 301 performs control to broadcast-transmit the beacon (Step S303). Specifically, the transmission control unit 301 instructs the frame generation unit 104 and the transmission unit 105 to broadcast-transmit the beacon.

On the other hand, when the beacon request is not the second beacon request (complying with the standard), that is the first beacon request (No in Step S302), the transmission control unit 301 determines whether or not the registration button or the like is pressed and the control device 300 is in the registration mode (Step S304). Here, when the result shows the registration mode (Yes in Step S304), the transmission control unit 301 performs control to broadcast-transmit the beacon (Step S303). When the result does not show the registration mode (No in Step S304), the transmission control unit 301 performs control not to transmit the beacon.

Furthermore, when the beacon request has not been received (No in Step S301), the transmission control unit 301 repeats the determination processing on whether or not the beacon request has been received (Step S301).

Figure 14:
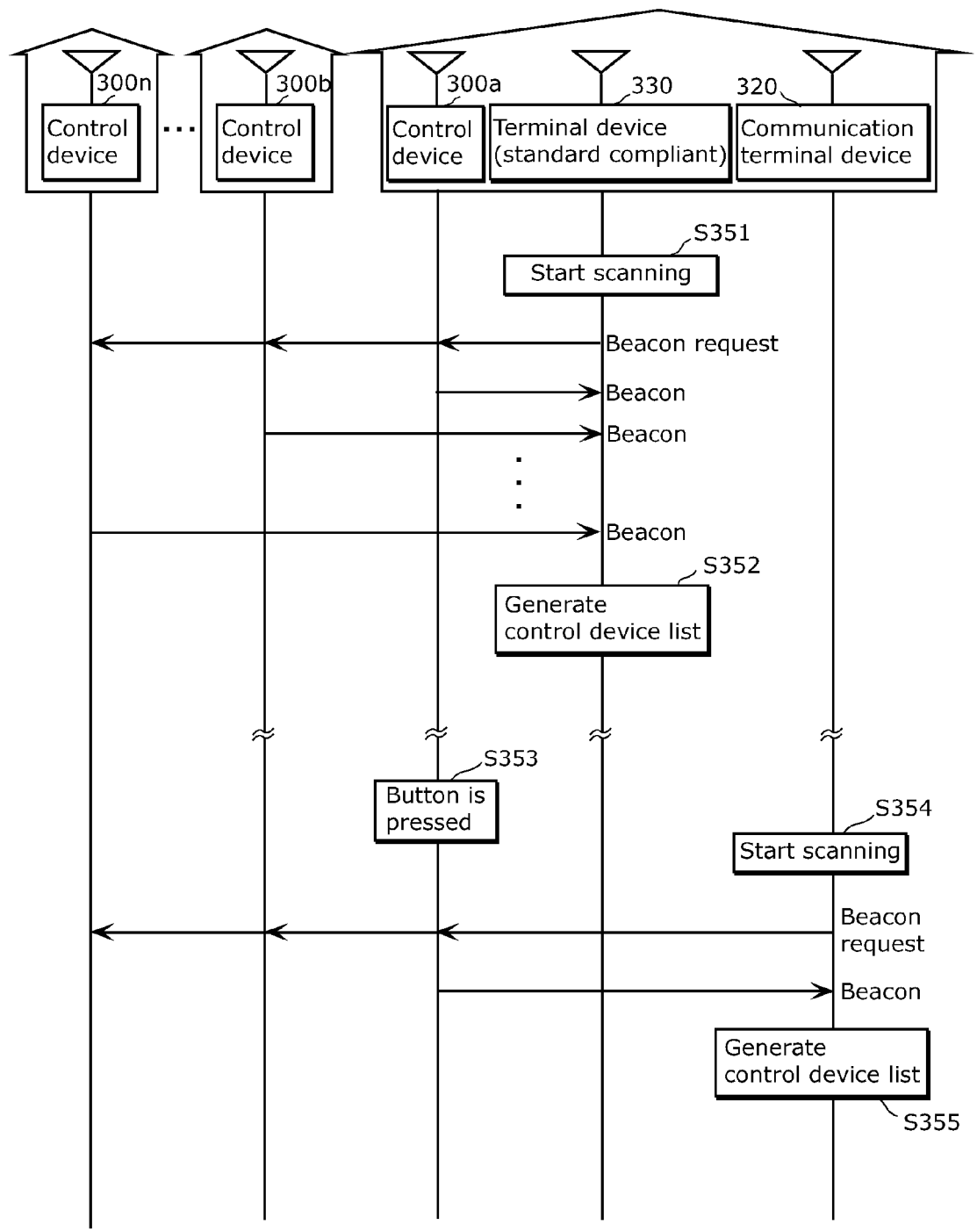
FIG. 14 is a sequence diagram indicating an example of specific operation in scanning according to Embodiment 3.

FIG. 14 is a sequence diagram indicating an example of specific operation in scanning according to Embodiment 3. To simplify the explanation, the sequence diagram in FIG. 14 does not include all of the operations in the flowchart indicated in FIG. 13. Furthermore, in FIG. 14, the home control device is designated as a control device 300a among the control devices 300 (300a, 300b, ... 300n). Furthermore, in FIG. 14, a communication terminal device 320 is a specific communication terminal device that transmits the first beacon request, and a communication terminal device 330 is a standard-compliant communication terminal device and transmits the second beacon request.

First, description is provided on the case where the communication terminal device 330 transmits the second beacon request.

When the registration button or the like of the communication terminal device 330 is pressed, scanning is started (Step S351). Thus, the communication terminal device 330 broadcast-transmits the second beacon request. In the scanning, the communication terminal device searches a plurality of control devices including control devices in nearby networks in neighbors and the like for a desired control device (a home control device) to be connected. In FIG. 14, when the control device 300a is not in the registration mode, the receiving unit 106 receives the beacon request from the communication terminal device 330.

Since the beacon request is the second beacon request, the control device 300a broadcast-transmits the beacon according to the beacon request from the communication terminal device 330 even not in the registration mode. At this time, the other control devices 300b, . . . 300n also broadcast-transmit the beacons according to the beacon requests from the communication terminal device 330.

The communication terminal device 330 receives the beacon transmitted from each of the control devices 300. The communication terminal device 330 retrieves from the beacon the network ID and the device address, for example. The retrieved network ID and the device address are stored into the control device list (Step S352).

After the scanning, the communication terminal device 330 transmits to each of the control devices 300 included in the control device list a registration request for causing the control device 300 to register the communication terminal device 330 as a target to be controlled. Each of the control devices 300 which has received the registration request transmits a registration response added with information indicating connection permission or connection rejection. The communication terminal device 330 can find the home control device 300a by receiving the registration response added with the information indicating connection permission from the control device 300a. After that, the communication terminal device 330 and the control device 300a perform authentication processing on key information or the like, thereby completing the registration.

Next, description is provided on the case where the communication terminal device 320 transmits the first beacon request.

The home control device 300a turns to the registration mode when the registration button or the like is pressed to register the communication terminal device 320 as a target to be controlled (Step S353). Next, when the registration button or the like of the communication terminal device 320 is pressed, scanning is started (Step S354). Thus, the communication terminal device 320 broadcast-transmits the beacon request.

Here, when the control device 300a is in the registration mode, the receiving unit 106 receives the first beacon request from the communication terminal device 320. Therefore, the control device 300a broadcast-transmits the beacon. The communication terminal device 320 which has received the beacon transmitted from the control device 300a retrieves the network ID and the device address from the beacon. The retrieved network ID and the device address are stored into the control device list (Step S355).

At this time, not only the home control device 300a but also the other control devices 300b, . . . 300n receive the beacon request transmitted from the communication terminal device 320. However, since the registration buttons or the like of the other control devices 300b, . . . 300n are not pressed (not in the registration mode), beacons are not transmitted.

Thus, the communication terminal device 320 receives only the beacon transmitted from the control device 300a. Specifically, the network ID and the device address of only the control device 300a are stored into the control device list.

After the scanning, the communication terminal device 320 transmits to the control device 300a included in the control device list a registration request for causing the control device 300a to register the communication terminal device 320 as a target to be controlled. Since the home control device 300a which has received the registration request is ready to accept registration (in the registration mode), the home control device 300a transmits back to the communication terminal device 220 a registration response added with information indicating connection permission. The communication terminal device 320 can find the home control device 300a by receiving the registration response added with the information indicating connection permission from the control device 300a. After that, the communication terminal device 320 and the control device 300a perform authentication processing on key information or the like, thereby completing the registration.

As described above, in the present embodiment, when the beacon request is the first beacon request, control is performed to broadcast-transmit the beacon only in the registration mode. Thus, even when there is a large number of control devices in nearby networks, the communication terminal device desired to be registered into the home control device as a target to be controlled can receive the beacon only from the home control device. Accordingly, the communication terminal device can search for the home control device and cause the home control device to register the communication terminal device as a target to be controlled, without a large-capacity memory. Furthermore, the communication terminal device can find the home control device more efficiently and thus shorten the time taken for registration.

Furthermore, in the present embodiment, when the beacon request is the second beacon request, control is performed to transmit the beacon every time. This allows supporting the communication terminal device which is complying with the standard and transmits the second beacon request, and performing processing according to both the first beacon request and the second beacon request.

Although the present embodiment has described the case where the communication terminal device 330 transmits the registration request to each of the control devices 300 included in the control device list, this is not an only example. For example, the control device 300 transmits a beacon including a parameter indicating that the registration button or the like of the control device 300 is pressed and the control device 300 is ready to accept registration. When there is a control device 300 corresponding to the beacon including such a parameter in the control device list, the communication terminal device 330 may determine that the control device 300 is the home control device 300a and transmit a registration request to the control device 300a.

(Embodiment 4)

Embodiment 4 describes processing performed when a reception level of the beacon request is measured, in addition to the structure in Embodiment 1.

Figure 15:
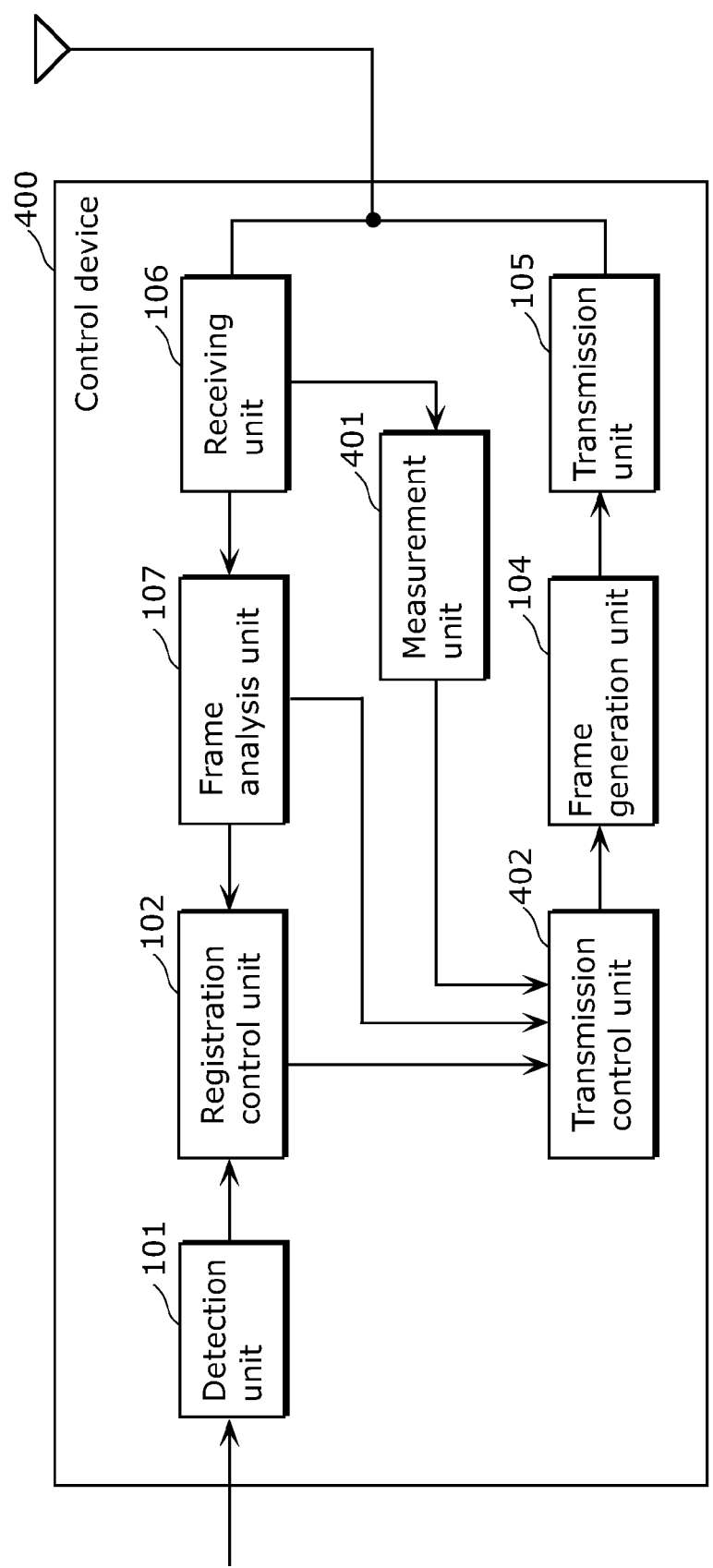
FIG. 15 is a block diagram indicating a structure of a control device according to Embodiment 4.

FIG. 15 is a block diagram indicating a structure of a control device according to Embodiment 4. It is to be noted that constituent elements same as those in Embodiment 1 are represented by the same numerals, and description is omitted.

Figure 16:
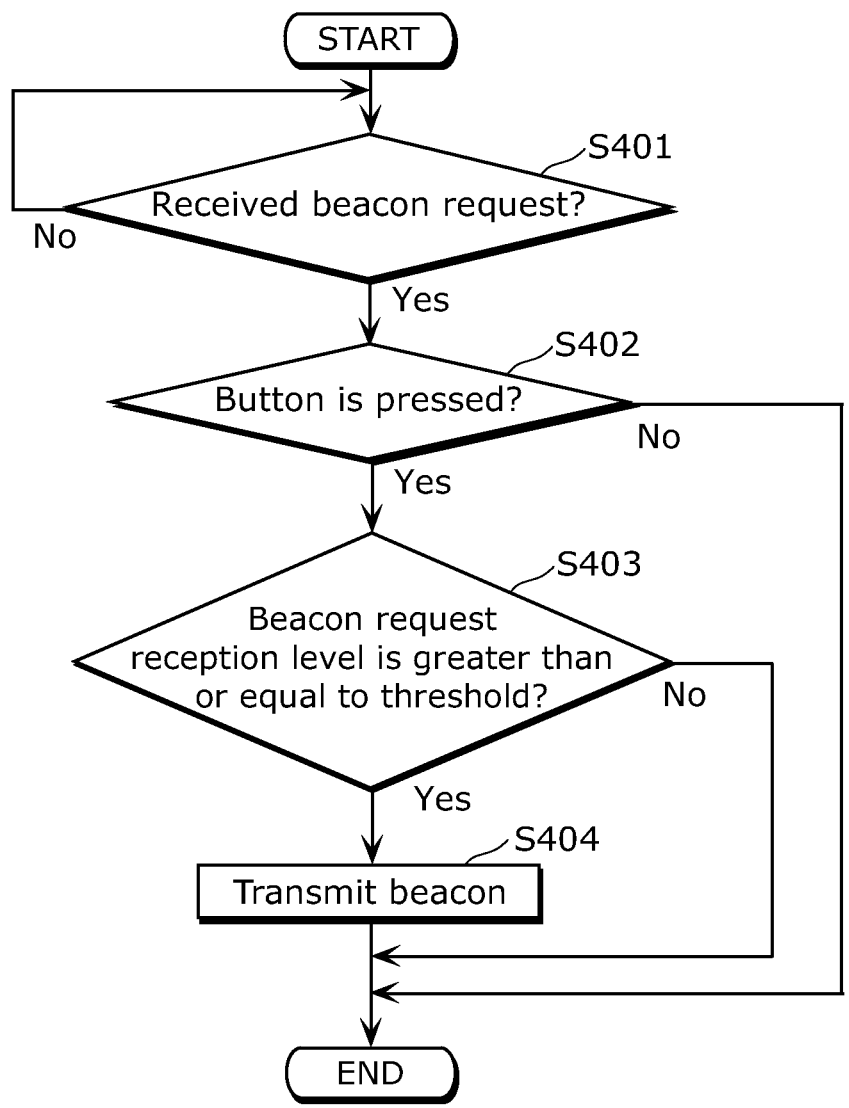
FIG. 16 is a flowchart indicating a flow of operation according to Embodiment 4.

The control device 400 is a device that executes registration processing including transmitting a beacon signal in response to a beacon request transmitted from a communication terminal device to register the communication terminal device as a target to be controlled via wireless communication. As illustrated in FIG. 16, the control device 400 includes a detection unit 101, a registration control unit 102, a transmission control unit 402, a frame generation unit 104, a transmission unit 105, a receiving unit 106, a frame analysis unit 107, and a measurement unit 401.

The measurement unit 401 measures a received field strength (reception level) of the beacon request received by the receiving unit 106.

When the receiving unit 106 has received the beacon request when the control device 400 is in the registration mode and the received field strength measured by the measurement unit 401 is greater than or equal to a predetermined specific threshold, the transmission control unit 402 performs control to broadcast-transmit a beacon including the network ID and the device address of the control device 400. Furthermore, even when the receiving unit 106 has received the beacon request when the control device 400 is in the registration mode, if the received field strength measured by the measurement unit 401 is smaller than the predetermined specific threshold, the transmission control unit 402 performs control not to transmit the beacon. Furthermore, when the receiving unit 106 has received the beacon request when the control device 400 is not in the registration mode, the transmission control unit 402 performs control not to transmit the beacon.

FIG. 16 is a flowchart indicating a flow of operation according to Embodiment 4.

The transmission control unit 402 determines whether or not the receiving unit 106 has received a beacon request (Step S401). Here, when the beacon request has been received (Yes in Step S401), the transmission control unit 402 determines whether or not a registration button or the like is pressed and the control device 400 is in the registration mode (Step S402). Here, when the result shows the registration mode (Yes in Step S402), the transmission control unit 402 determines whether or not the received field strength measured by the measurement unit 401 is greater than or equal to a predetermined specific threshold (Step S403). When the result shows that the received field strength is greater than or equal to the threshold (Yes in Step S403), the transmission control unit 402 performs control to broadcast-transmit the beacon (Step S404). Specifically, the transmission control unit 402 instructs the frame generation unit 104 and the transmission unit 105 to broadcast-transmit the beacon.

In contrast, when the received field strength is smaller than the threshold (No in Step S403), the transmission control unit 402 performs control not to transmit the beacon.

Also when the result does not show the registration mode (No in Step S402), the transmission control unit 402 performs control not to transmit the beacon.

Furthermore, when the beacon request has not been received (No in Step S401), the transmission control unit 402 repeats the determination processing on whether or not the beacon request has been received (Step S401).

Figure 17:
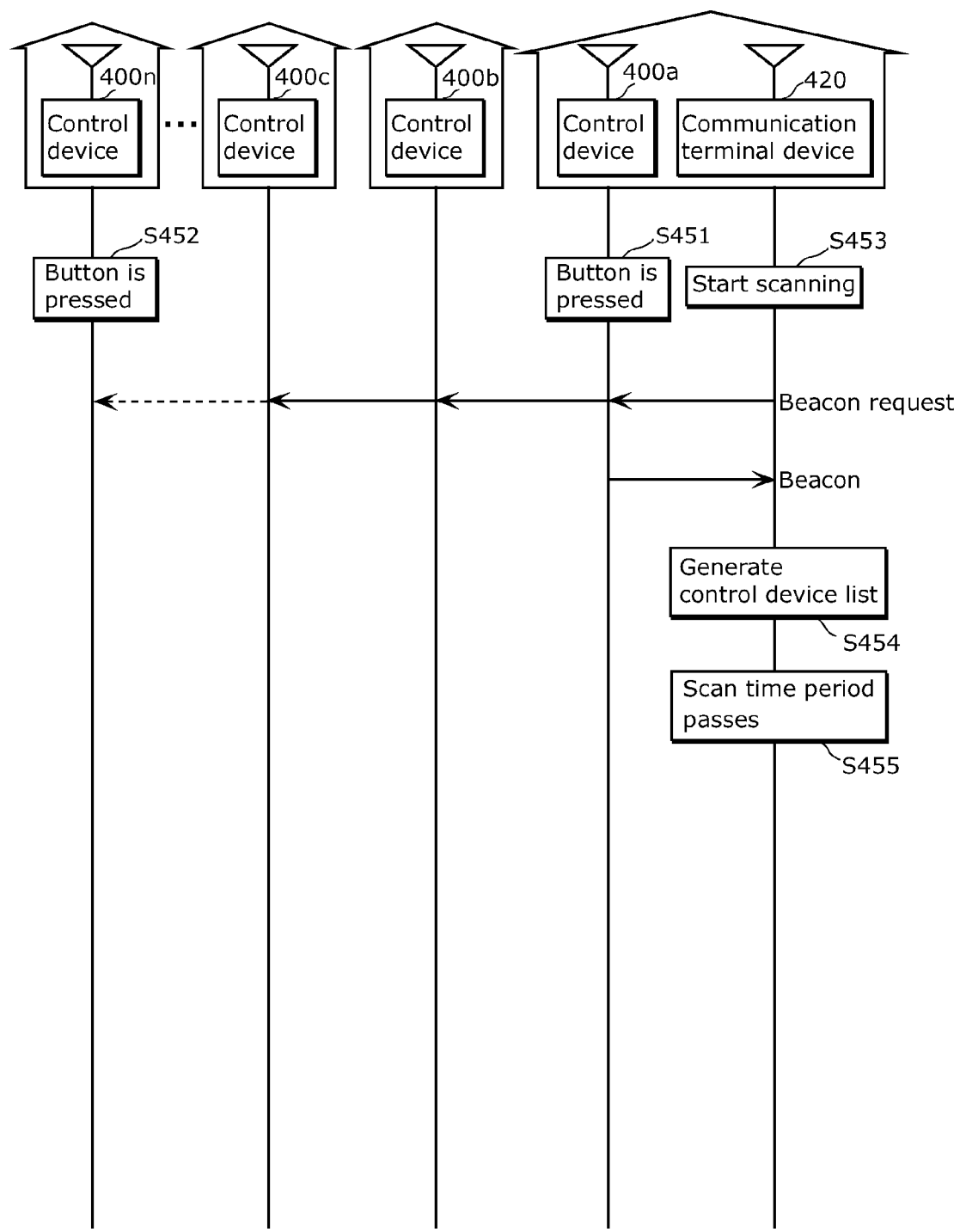
FIG. 17 is a sequence diagram indicating an example of specific operation in scanning according to Embodiment 4.

FIG. 17 is a sequence diagram indicating an example of specific operation in scanning according to Embodiment 4. To simplify the explanation, the sequence diagram in FIG. 17 does not include all of the operations in the flowchart indicated in FIG. 16. Furthermore, in FIG. 17, the home control device is designated as a control device 400a among the control devices 400 (400a, 400b, 400c, . . . 400n). Furthermore, in FIG. 17, when the communication terminal device 420 is to be registered as a target to be controlled, it is assumed that not only the home control device 400a but also the other control device 400n are turned to the registration mode. At this time, it is assumed that the received field strength of the beacon request received by the home control device 400a is greater than or equal to the threshold and the received field strength of the beacon request received by the control device 400n is smaller than the threshold.

In FIG. 17, the home control device 400a turns to the registration mode when the registration button or the like is pressed to register the communication terminal device 420 as a target to be controlled (Step S451). At this time, the other control device 400n also turns to the registration mode when the registration button or the like is pressed to register the other communication terminal device (not shown) as a target to be controlled (Step S452).

Next, when the registration button or the like of the communication terminal device 420 is pressed, scanning is started (Step S453). Thus, the communication terminal device 420 broadcast-transmits the beacon request. In the scanning, the terminal device searches a plurality of control devices including control devices in nearby networks in neighbors and the like for a desired control device (a home control device) to be connected.

Here, the control device 400a receives the beacon request from the communication terminal device 420 in the registration mode. At this time, since the received field strength of the beacon request received by the home control device 400a is greater than or equal to the threshold, the control device 400a broadcast-transmits the beacon.

Furthermore, the control device 400n receives the beacon request from the communication terminal device 420 in the registration mode. At this time, since the received field strength of the beacon request received by the control device 400n is smaller than the threshold, the control device 400n does not transmit the beacon.

The communication terminal device 420 which has received the beacon transmitted from the control device 400a retrieves the network ID and the device address from the beacon. The retrieved network ID and the device address are stored into the control device list (Step S454). Then, at the communication terminal device 420, the scan time period passes (Step S455).

At this time, not only the home control device 400a but also the other control devices 400b, 400c, . . . except 400n, receive the beacon request transmitted from the communication terminal device 420. However, since the registration buttons or the like of the other control devices 400b, 400c, . . . are not pressed (not in the registration mode), beacons are not transmitted.

Thus, the communication terminal device 420 receives only the beacon transmitted from the control device 400a. Specifically, the network ID and the device address of only the control device 400a are stored into the control device list.

After the scanning, the communication terminal device 420 transmits to the control device 400a included in the control device list a registration request for causing the control device 400a to register the communication terminal device 420 as a target to be controlled. Since the home control device 400a which has received the registration request is ready to accept registration (in the registration mode), the home control device 400a transmits back to the communication terminal device 420 a registration response added with information indicating connection permission. The communication terminal device 420 can find the home control device 400a by receiving the registration response added with the information indicating connection permission from the control device 400a. After that, the communication terminal device 420 and the control device 400a perform authentication processing on key information or the like, thereby completing the registration.

As described above, in the present embodiment, control is performed to broadcast-transmit the beacon only when the beacon request is received with a received field strength greater than or equal to the threshold in the registration mode. Thus, for example when a communication terminal device is to be registered into a home control device, transmission of a beacon can be limited according to the received field strength of a beacon request even when the other control device is in the registration mode. Accordingly, the communication terminal device can search for the home control device and cause the home control device to register the communication terminal device as a target to be controlled, without a large-capacity memory. Furthermore, the communication terminal device can find the home control device more efficiently and thus shorten the time taken for registration.

(Modification Example)

In the present modification, the transmission control unit 402 performs the following operation in addition to the operations described in Embodiment 4 above.

The transmission control unit 402 performs control to broadcast-transmit a beacon in the case where the detection unit 101 detects the control signal again within a predetermined period after the registration control unit 102 is executing the registration processing (in the registration mode) and when the received field strength of the beacon request is smaller than a specific threshold. Specifically, the transmission control unit 402 performs control to broadcast-transmit the beacon in the case where the control device 400 turns to the registration mode again within a predetermined period after the registration mode and when the received field strength is smaller than the specific threshold.

Figure 18:
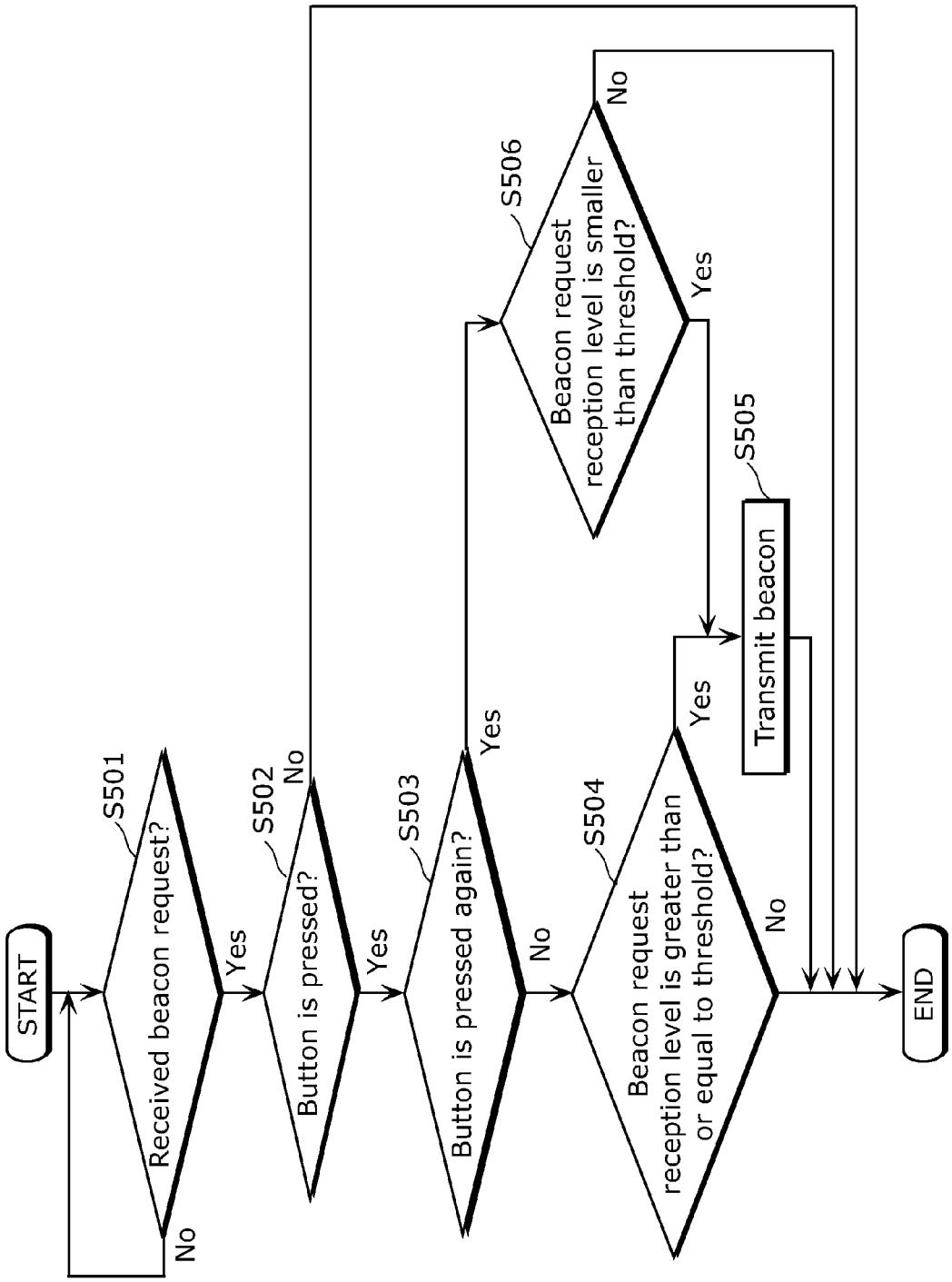
FIG. 18 is a flowchart indicating a flow of operation according to a modification of Embodiment 4.

FIG. 18 is a flowchart indicating a flow of operation according to Embodiment 4.

The transmission control unit 402 determines whether or not the receiving unit 106 has received a beacon request (Step S501). Here, when the beacon request has been received (Yes in Step S501), the transmission control unit 402 determines whether or not a registration button or the like is pressed and the control device 400 is in the registration mode (Step S502). Here, when the result shows the registration mode (Yes in Step S502), the transmission control unit 402 determines whether or not the control device 400 turns to the registration mode again within the predetermined period after the registration mode (Step S503).

Here, when the result shows that the control device 400 has not turned to the registration mode again (No in S503), the transmission control unit 402 determines whether or not the received field strength measured by the measurement unit 401 is greater than or equal to the predetermined specific threshold (Step S504). When the result shows that the received field strength is greater than or equal to the threshold (Yes in Step S504), the transmission control unit 402 performs control to broadcast-transmit the beacon (Step S505). Specifically, the transmission control unit 402 instructs the frame generation unit 104 and the transmission unit 105 to broadcast-transmit the beacon. In contrast, when the received field strength is smaller than the threshold (No in Step S504), the transmission control unit 402 performs control not to transmit the beacon.

Furthermore, when the result shows that the control device 400 has turned to the registration mode again (No in S503), the transmission control unit 402 determines whether or not the received field strength measured by the measurement unit 401 is smaller than the specific threshold (Step S506). When the result shows that the received field strength is smaller than the threshold (Yes in Step S506), the transmission control unit 402 performs control to broadcast-transmit the beacon (Step S505). Specifically, the transmission control unit 402 instructs the frame generation unit 104 and the transmission unit 105 to broadcast-transmit the beacon. In contrast, when the received field strength is not smaller than the threshold (No in Step S506), the transmission control unit 402 performs control not to transmit the beacon.

Also when the result does not show the registration mode (No in Step S502), the transmission control unit 402 performs control not to transmit the beacon.

Furthermore, when the beacon request has not been received (No in Step S501), the transmission control unit 402 repeats the determination processing on whether or not the beacon request has been received (Step S501).

Figure 19:
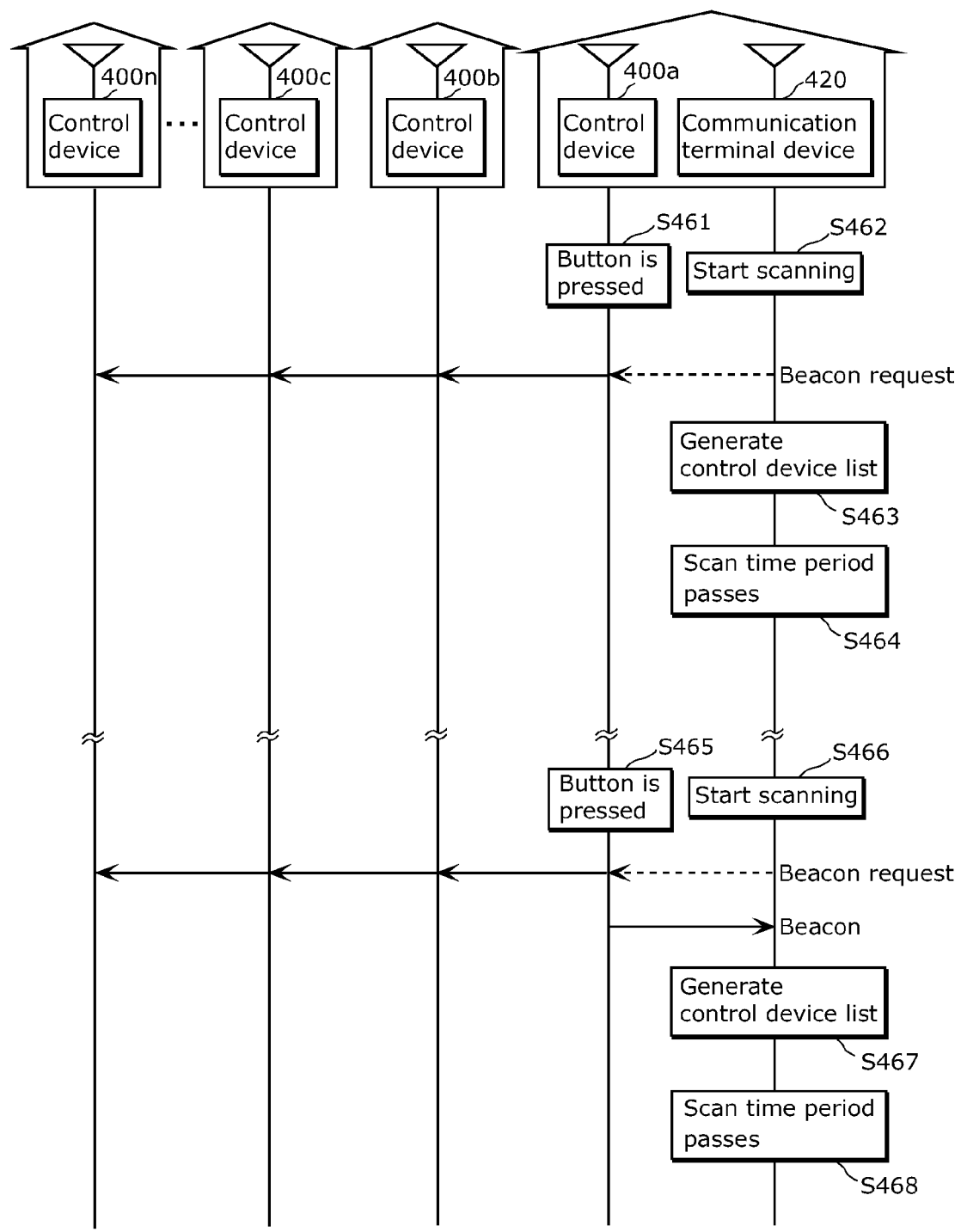
FIG. 19 is a sequence diagram indicating an example of specific operation in scanning according to the modification of Embodiment 4.

FIG. 19 is a sequence diagram indicating an example of specific operation in scanning according to the modification of Embodiment 4. To simplify the explanation, the sequence diagram in FIG. 19 does not include all of the operations in the flowchart indicated in FIG. 18. Furthermore, in FIG. 19, the home control device is designated as a control device 400a among the control devices 400 (400a, 400b, 400c, . . . 400n). Furthermore, in FIG. 19, it is assumed that the received field strength of the beacon request received by the home control device 400a is smaller than the threshold.

In FIG. 19, the home control device 400a turns to the registration mode when the registration button or the like is pressed to register the communication terminal device 420 as a target to be controlled (Step S461). Next, when the registration button or the like of the communication terminal device 420 is pressed, scanning is started (Step S462). Thus, the communication terminal device 420 broadcast-transmits the beacon request.

Here, the control device 400a receives the beacon request from the communication terminal device 420 in the registration mode. At this time, since the received field strength of the beacon request received by the control device 400a is smaller than the threshold, the control device 400a does not transmit the beacon.

At this time, not only the home control device 400a but also the other control devices 400b, 400c, . . . 400n receive the beacon request transmitted from the communication terminal device 420. However, since the registration buttons or the like of the other control devices 400b, 400c, . . . 400n are not pressed (not in the registration mode), beacons are not transmitted.

Since the communication terminal device 420 does not receive the beacon, the network ID, the device address, and so on are not stored into the control device list (Step S463). Then, at the communication terminal device 420, the scan time period passes (Step S464).

Thus, since the communication terminal device 420 cannot find the home control device 400a, the communication terminal device 420 is required to perform the registration processing again.

In FIG. 19, the home control device 400a turns to the registration mode again when the registration button or the like is pressed, for example (Step S465). Next, when the registration button or the like of the communication terminal device 420 is pressed, scanning is started again (Step S466). Thus, the communication terminal device 420 broadcast-transmits the beacon request.

Here, the control device 400a receives the beacon request from the communication terminal device 420 when the control device 400a is in the registration mode again. At this time, since the received field strength of the beacon request received by the home control device 400a is smaller than the threshold, the control device 400a broadcast-transmits the beacon.

The communication terminal device 420 which has received the beacon transmitted from the control device 400a retrieves the network ID and the device address from the beacon. The retrieved network ID and the device address are stored into the control device list (Step S467). Then, at the communication terminal device 420, the scan time period passes (Step S468).

At this time, not only the home control device 400a but also the other control devices 400b, 400c, . . . 400n receive the beacon request transmitted from the communication terminal device 420. However, since the registration buttons or the like of the other control devices 400b, 400c, . . . 400n are not pressed (not in the registration mode), beacons are not transmitted.

Thus, the communication terminal device 420 receives only the beacon transmitted from the control device 400a. Specifically, the network ID and the device address of only the control device 400a are stored into the control device list.

After the scanning, the communication terminal device 420 transmits to the control device 400a included in the control device list a registration request for causing the control device 400a to register the communication terminal device 420 as a target to be controlled. Since the home control device 400a which has received the registration request is ready to accept registration (in the registration mode), the home control device 400a transmits back to the communication terminal device 420 a registration response added with information indicating connection permission. The communication terminal device 420 can find the home control device 400a by receiving the registration response added with the information indicating connection permission from the control device 400a. After that, the communication terminal device 420 and the control device 400a perform authentication processing on key information or the like, thereby completing the registration.

As described above, in the present modification, control is performed to broadcast-transmit the beacon in the case where the control device 400a turns to the registration mode again in a predetermined period after the registration mode and when the received field strength is smaller than a specific threshold. Even when the received field strength of the beacon from the home control device is low for some reasons, the home control device is not missed in the scanning by the communication terminal device and the communication terminal device can be registered, thanks to this registration processing again.

In each of the above non-limiting embodiments, the control device may understand the statuses of the nearby networks (control devices) and perform control to broadcast-transmit the beacon in response to the beacon request from the communication terminal device even when the registration button or the like is not pressed (not in the registration mode), as long as the number of the other peripheral control devices is smaller than a predetermined threshold.

Furthermore, although the transmission control unit of the control device broadcast-transmits (simultaneously transmits) the beacon in each of the above non-limiting embodiments, simultaneous transmission (broadcast transmission, multicast transmission, and anycast transmission) is not an only example. For example, the beacon may be transmitted by unicast transmission.

Furthermore, in each of the above non-limiting embodiments, the transmission unit and the receiving unit do not necessarily adopt wireless communication and may adopt wire communication such as power line communication (PLC), Ethernet (registered trademark), universal serial bus (USB), high-definition multimedia interface (HDMI) (registered trademark), and IEEE 1394. This allows the control device in the present invention to communicate via various transmission media.

Although in the scanning in each of the above non-limiting embodiments the communication terminal device transmits the beacon request and receives the beacon transmitted from the control device as defined in IEEE 802.15.4, this is not an only example. For example, in scanning defined in IEEE 802.11, the communication terminal device transmits a probe request and receives a probe response transmitted from the control device. As described above, the control device in the present invention can be realized in the same manner by probe transmission and probe response.

Furthermore, in each of the above non-limiting embodiments, each constituent element may be implemented by being configured with dedicated hardware or by executing a software program appropriate for each constituent element. Each constituent element may be implemented by reading and executing the software program recorded on a hard disk or a recording medium such as a semiconductor memory, performed by a program execution unit such as a CPU or a processor. Here, the software which implements a control device or the like in each of the above non-limiting embodiments is a program described below.

Specifically, this program is a program for causing a computer to execute a method for scanning for a control device that executes registration processing including transmitting a beacon signal in response to a beacon request transmitted from a communication terminal device to register the communication terminal device as a target to be controlled via wireless communication. The method includes: receiving a first beacon request for performing the registration processing from the communication terminal device; detecting a control signal indicating a request for starting the registration processing; starting the registration processing when the control signal is detected in the detecting and executing the registration processing for a certain period; transmitting the beacon signal for notifying presence of the control device when the first beacon request is received in a period during which the registration processing is executed in the starting; and avoid transmitting the beacon signal when the first beacon request is received in a period during which the registration processing is not executed in the starting.

The foregoing has described the control device according to one or more aspects based on the non-limiting embodiments, however, the present invention is not limited to these non-limiting embodiments. Other forms in which various modifications apparent to those skilled in the art are applied to the non-limiting embodiments, or forms structured by combining constituent elements of different non-limiting embodiments are included within the scope of the embodiments, unless such changes and modifications depart from the scope of the present invention.

With the present invention, a communication terminal device can search for a home control device and cause the control device to register the communication terminal device as a target to be controlled, without a large-capacity memory. The present invention can be applied to a control device and so on which registers the communication terminal device as a target to be controlled via wire communication network or wireless communication network.

REFERENCE SIGNS LIST 10, 120, 220, 320, 330, 420 communication terminal device
20, 100, 200, 300, 400 control device
101 detection unit
102 registration control unit
103, 201, 301, 402 transmission control unit 104 frame generation unit
105 transmission unit
106 receiving unit
107, 203, 303 frame analysis unit
202, 302 distinguishing unit
401 measurement unit

The invention claimed is:

1. A control device that executes registration processing and control of communication terminals including transmitting a beacon signal in response to a beacon request transmitted from a communication terminal device to register the communication terminal device as a target to be controlled via wireless communication, the control device comprising:
 a non-transitory memory storing a program; and
 a hardware processor that executes the program,
 wherein the hardware processor performs the following using the non-transitory memory:
 receiving a first beacon request including distinguishing information for distinguishing whether the beacon request is transmitted from another control device that executes registration processing and control of communication terminals or a communication terminal device;
 detecting a control signal indicating a request for starting the registration processing;
 starting the registration processing when the control signal is detected;
 determining whether the first beacon request is transmitted from the other control device or the communication terminal device based on the distinguishing information;
 transmitting the beacon signal when the first beacon request is received in a period during which the registration processing is executed and it is determined that the first beacon request is transmitted from the communication terminal device;
 avoid transmitting the beacon signal when the first beacon request is received in a period during which the registration processing is not executed and it is determined that the first beacon request is transmitted from the communication terminal device; and
 transmitting the beacon signal even in the period during which the registration processing is not executed when the first beacon request is received and it is determined that the first beacon request is transmitted from the other control device.

2. The control device according to claim 1,
 wherein the communication terminal device is registered as the target to be controlled when a registration request transmitted from the communication terminal device is received in response to the beacon signal after the beacon signal is transmitted to the communication terminal device in a period during which the registration processing is executed.

3. The control device according to claim 1,
 wherein the beacon signal is transmitted even in a period during which the registration processing is not executed when a second beacon request complying with a predetermined standard is received from the communication terminal device or the other control device.

4. The control device according to claim 3,
 wherein the second beacon request is a beacon request frame complying with Institute of Electrical and Electronics Engineers (IEEE) 802.15.4, and
 the beacon signal is a beacon frame complying with IEEE 802.15.4.

5. The control device according to claim 3,
 wherein the second beacon request is a probe request frame complying with IEEE 802.11, and
 the beacon signal is a probe response frame complying with IEEE 802.11.

6. The control device according to claim 1, wherein the hardware processor further performs the following using the non-transitory memory:
 measuring a received field strength of the beacon request received, and
 transmitting the beacon signal when the received field strength is greater than or equal to a specific threshold.

7. The control device according to claim 6,
 wherein the beacon signal is transmitted in the case where the control signal is detected again within a predetermined period after a period during which the registration processing is executed and when the received field strength is smaller than a specific threshold.

8. A communication system comprising:
 the control device according to claim 1; and
 a communication terminal device that transmits the beacon request to the control device to register the communication terminal device as a target to be controlled.

9. A method for scanning for a control device that executes registration processing and control of communication terminals including transmitting a beacon signal in response to a beacon request transmitted from a communication terminal device to register the communication terminal device as a target to be controlled via wireless communication, the method comprising:
 receiving a beacon request including distinguishing information for distinguishing whether the beacon request is transmitted from another control device that executes registration processing and control of communication terminals or a communication terminal device;
 detecting a control signal indicating a request for starting the registration processing;
 starting the registration processing when the control signal is detected;
 determining whether the beacon request is transmitted from the other control device or the communication terminal device based on the distinguishing information;
 transmitting the beacon signal when the beacon request is received in a period during which the registration processing is executed and it is determined that the beacon request is transmitted from the communication terminal device;
 avoid transmitting the beacon signal when the beacon request is received in a period during which the registration processing is not executed and it is determined that the beacon request is transmitted from the communication terminal device; and
 transmitting the beacon signal even in the period during which the registration processing is not executed when the beacon request is received and it is determined that the beacon request is transmitted from the other control device.

10. A method for scanning for a control device that executes registration processing and control of communication terminals including transmitting a beacon signal in response to a beacon request transmitted from a communication terminal device to register the communication terminal device as a target to be controlled via wireless communication, the method comprising:
 receiving a beacon request including distinguishing information for distinguishing whether the beacon request is transmitted from another control device that executes registration processing and control of communication terminals or a communication terminal device;
detecting a control signal indicating a request for starting the registration processing;
starting the registration processing when the control signal is detected;
determining whether the beacon request is transmitted from the other control device or the communication terminal device based on the distinguishing information;
transmitting the beacon signal when the beacon request is received in a period during which the registration processing is executed and it is determined that the beacon request is transmitted from the communication terminal device;
avoid transmitting the beacon signal when the beacon request is received in a period during which the registration processing is not executed and it is determined that the beacon request is transmitted from the communication terminal device; and
transmitting the beacon signal even in the period during which the registration processing is not executed when the beacon request is received and it is determined that the beacon request is transmitted from the other control device;
measuring a received field strength of the beacon request received, and
transmitting the beacon signal when the received field strength is greater than or equal to a specific threshold.

* * * * *